(12) United States Patent
Alban et al.

(10) Patent No.: US 7,454,290 B2
(45) Date of Patent: Nov. 18, 2008

(54) GPS/INS VEHICLE ATTITUDE SYSTEM

(75) Inventors: Santiago Alban, Palo Alto, CA (US); Stephen M. Rock, Cupertino, CA (US); J. David Powell, Menlo Park, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 225 days.

(21) Appl. No.: 10/944,458

(22) Filed: Sep. 17, 2004

(65) Prior Publication Data
US 2005/0137799 A1 Jun. 23, 2005

Related U.S. Application Data

(60) Provisional application No. 60/503,938, filed on Sep. 18, 2003.

(51) Int. Cl.
*G01C 21/26* (2006.01)
(52) U.S. Cl. ............. 701/213; 342/357.14; 342/357.11; 342/357.15
(58) Field of Classification Search ................ 701/213, 701/215, 13, 207; 342/357.14, 357.06, 357.11, 342/357.15; 340/429
See application file for complete search history.

(56) References Cited

U.S. PATENT DOCUMENTS

| | | | | |
|---|---|---|---|---|
| 5,575,316 | A * | 11/1996 | Pollklas | 141/198 |
| 5,617,317 | A * | 4/1997 | Ignagni | 701/215 |
| 6,721,657 | B2 * | 4/2004 | Ford et al. | 701/213 |
| 6,754,584 | B2 * | 6/2004 | Pinto et al. | 701/215 |
| 7,136,751 | B2 * | 11/2006 | Pinto et al. | 701/215 |
| 2002/0069019 | A1 * | 6/2002 | Lin | 701/301 |
| 2002/0158796 | A1 | 10/2002 | Humphrey et al. | 342/357.14 |
| 2003/0130791 | A1 * | 7/2003 | McIntyre | 701/213 |
| 2004/0073364 | A1 * | 4/2004 | Jung et al. | 701/213 |
| 2004/0148068 | A1 * | 7/2004 | Fowell et al. | 701/13 |
| 2004/0176881 | A1 * | 9/2004 | Shiho et al. | 701/4 |
| 2004/0181335 | A1 * | 9/2004 | Kim et al. | 701/207 |
| 2004/0193373 | A1 * | 9/2004 | Beauregard et al. | 701/213 |
| 2006/0100781 | A1 * | 5/2006 | Lin et al. | 701/216 |

FOREIGN PATENT DOCUMENTS

JP 2001280997 A * 10/2001

(Continued)

OTHER PUBLICATIONS

Abbot, E. and Powell, J.D., "An Examination of the Relative Merits of Various Sensors for Vehicle Navigation", Proceedings of the ION GPS-95, Palm Springs, CA, Sep. 1995.

(Continued)

*Primary Examiner*—Tuan C To
(74) *Attorney, Agent, or Firm*—Lumen Intellectual Property Services Inc.

(57) ABSTRACT

Systems are provided to increase the robustness of a low-cost GPS system by coupling it with an INS system, and by using one-satellite attitude determination in conjunction with the traditional multiple-satellite method. The system has demonstrated accuracy and robustness approaching needed standards for automobile control systems. The applications of this system are abundant, including real-time vehicle system ID, slip angle estimation, position estimation by GPS and dead reckoning, as well as sophisticated control systems.

3 Claims, 21 Drawing Sheets

FOREIGN PATENT DOCUMENTS

JP    2003212197 A  *  7/2003

OTHER PUBLICATIONS

Bell, Thomas et al., "Automatic Steering of Farm vehicles Using GPS", 3rd International Conference on Precision Agriculture, Minneapolis, Minnesota, Jun. 1996.

Cohen, C.E., "Attitude Determination Using GPS", Ph.D. Thesis, Stanford University, 1992.

Dumaine, Michael, "High Precision Attitude Using Low Cost GPS Receivers", Proceedings of the ION GPS-96, Kansas City, MO, Sep. 1996.

Eissfeller, B. et.al, "An Integrated Low Cost GPS/INS Attitude Determination System and Position Location System", Proceedings of the ION GPS 96, Kansas city, Missouri, Sep. 1996. pp. 975-981.

Euler, H.J. and Hill, C.H., "Attitude Determination: Exploring all Information for Optimal Ambiguity Resolution", Proceedings of the ION GPS-95, Palm Springs, CA, Sep. 1995.

Euler, H.J. and Hill, C.H., "An Optimal Ambiguity Resolution Technique for Attitude Determination", Proceedings of the 1996 IEEE Position Location and Navigation Symposium, PLANS, Atlanta, GA, USA. pp. 262-269.

Gebre-Egziabher, Demoz et al., "Inertially-Aided GPS-based Attitude Heading Reference System (AHRS) for General Aviation Aircraft", Proceedings of the ION GPS-97, Kansas City, MO, Sep. 1997.

Gebre-Egziabher, Demoz et al., "Inexpensive GPS/Inertial AHRS for General Aviation applications", Proceedings of the 1996 IEEE Position Location and Navigation Symposium, PLANS, Palm Springs, CA, Mar. 1998.

Gebre-Egziabher, Demoz et al., "A Low-Cost GPS/Inertial Attitude Heading Reference System (AHRS) for General Aviation Aircraft", Proceedings of the IEEE Position, Location and Navigation Symposium—PLANS '98, Palm Springs, California, Apr. 1998 [11]

Hayward, R. C. and Powell, J.D., "Real Time Calibration of Antenna Phase Errors for Ultra-Short Baseline Attitude Systems", Proceedings of the ION GPS-98, Nashville, TN, Sep. 1998.

Hayward, R. C. et al., "Single Baseline GPS Based Attitude Heading Reference System (AHRS) for Aircraft Applications", Proceedings of the american Control Conference, San Diego, CA, Jun. 1999.

Kruczynski, Leonard et al., "Results of DC-10 Tests Using GPS Attitude Determination", Proceedings of the ION GPS-95. Part2 (of 2), Palm Springs, CA, USA. pp. 1743-1750.

Robert Bosch Corporation. DRS-MM1Yaw-Rate Sensor Specification Sheet, 1999.

* cited by examiner

GPS/INS VEHICLE ATTITUDE SYSTEM

CROSS-REFERENCE TO RELATED APPLICATIONS

This application is cross-referenced to and claims priority from U.S. Provisional Application 60/503,938 filed Sep. 18, 2003, which is hereby incorporated by reference.

FIELD OF THE INVENTION

The invention relates to vehicle attitude recognition systems and methods. More particularly, the invention relates to vehicle attitude systems using global positioning systems (GPS) and inertial navigation systems (INS).

BACKGROUND OF THE INVENTION

Modern automobiles are equipped with a variety of control systems that improve passenger safety and comfort. Such systems include anti-lock brakes, differential steering and cruise control. Recently, GPS receivers have also been added to many cars for use in positioning purposes, allowing the driver to view his/her position on a map, and receive directions in real time. The advent of GPS receivers in cars has initiated efforts to enhance existing control systems, and to create new ones such as car-following and lane-keeping control. Many of these control systems require measurements of the vehicle's attitude [15].

Attitude determination by differential carrier-phase GPS has been studied extensively by researchers, and has resulted in numerous publications. However, few practical products have emerged from this research to date. The commercial attitude systems that do exist perform very well in environments where many GPS satellites are viewable with few obstructions, but not where buildings and trees cause frequent interruptions and outages of GPS signals. The traditional GPS attitude solution requires three or four satellites (depending on whether line bias is known) and depends on a continuous, integrated value of the carrier phase from multiple antennas; any momentary interruption in the signal tracking causes the integration to reinitialize (this is called a cycle slip). A cycle slip requires that the attitude-computation algorithm perform a new integer-ambiguity search, which is always susceptible to error, especially if some of the signals are noisy. A GPS attitude system mounted on a car often sees enough cycle slips and noisy signals to prevent convergence of integer searches, or worse, to allow convergence to wrong integer solutions. In addition to this performance shortcoming, commercial GPS attitude systems are prohibitively expensive (over $10K) for general automotive use. Accordingly, the art is in need of new developments of vehicle attitude systems.

SUMMARY OF THE INVENTION

This invention provides a low-cost and robust GPS-INS attitude system for vehicles. The desired accuracy of the system according to one embodiment is such that it can be used in ground vehicle control systems (about 1°, based on tractor control systems) [2]. The system could be made with three relatively low-cost GPS receivers with integrated carrier-phase output, and automotive-grade INS components. The description covers the concepts used to construct this attitude system, including GPS attitude determination with multiple satellites and with a single satellite, and several robustness enhancements to improve system integrity: identification of noisy measurements by residual inspection, exploiting baseline redundancy, and INS-aided integer searches. Some examples are also included regarding the hardware and software used to realize the system. Finally, the system performance is validated with results from static rooftop tests and from actual road tests.

BRIEF DESCRIPTION OF THE DRAWINGS

The objectives and advantages of the invention will be understood by reading the following detailed description in conjunction with the drawings, in which.

DETAILED DESCRIPTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

I. GPS Attitude Determination with Multiple Satellites

A. Linear GPS Attitude Equation

Figure 1:
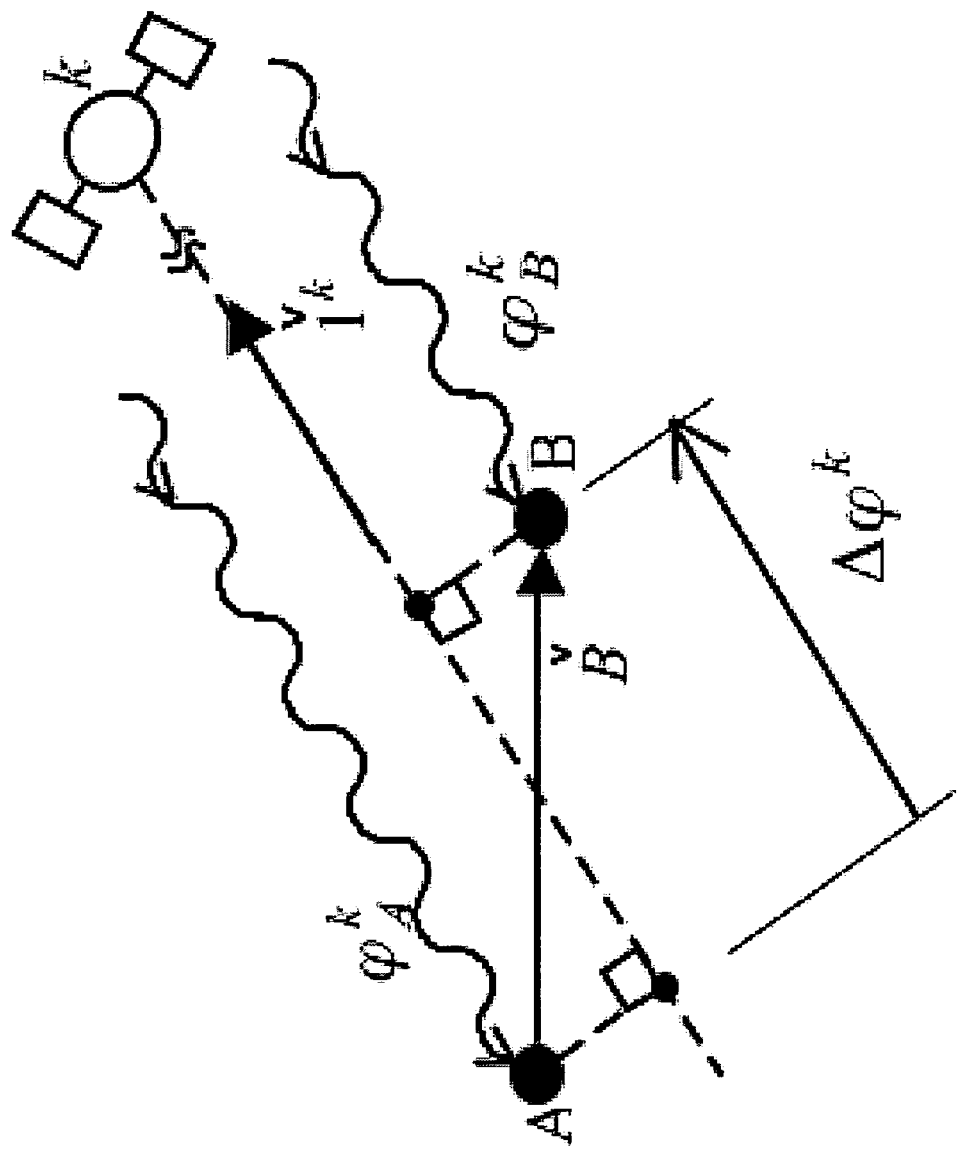
FIG. 1 shows a vector diagram for attitude determination.

The basic linear attitude equation is devised to solve for the three components of a baseline vector, oriented arbitrarily in space. In FIG. 1, points A and B define the baseline vector $\check{B}$, and correspond to the phase centers of the GPS antennas.

The differential carrier phase for satellite k is simply the difference of the two integrated carrier phases. This quantity is a measure of length, usually expressed in cycles (1 cycle=19 cm for GPS L1). Neglecting integer ambiguities and line bias at this level, the differential carrier phase measurement ($\Delta\phi^k$) would be equivalent to the projection of $\check{B}$ onto the line-of-sight unit-vector to the satellite $\check{(1^k)}$.

Noting that the magnitude of the line-of-sight (LOS) vector is unity, this relationship is expressed as follows:

$$\Delta\varphi^k = \varphi_A^k - \varphi_B^k = \check{1}^{k^T} \check{B} \quad (1)$$

If K satellites are in view, a matrix equation can be written, where each row looks like Eq. 1:

$$\Delta\check{\Phi} = H\check{B} \quad (2)$$

where:

$\Delta\check{\Phi} = [\Delta\varphi^1 \; \Delta\varphi^2 \; L \; \Delta\varphi^K]^T$ $H = \begin{bmatrix} \check{1}^1 & \check{1}^2 & L & \check{1}^K \end{bmatrix}^T$ $\check{B} = [X \; Y \; Z]^T$ The integrated carrier-phase measurement read from a GPS receiver is usually reported in two values: an integrated number of cycles (an integer), and the carrier phase, which represents the fractional part of the distance (in cycles) from the transmitter to the receiver. The initial value of the integrated number of cycles is, for practical purposes, a random value; the integration follows the movement of the receiver relative to the transmitter, while the signal is being tracked. If a cycle slip occurs, the integrated number of cycles is reset to some new random integer value, but the fractional carrier phase value remains continuous. In the linear equation, the unknown initial value of the integrated number of cycles is included as the integer ambiguity matrix, N:

$$\Delta\check{\Phi} + N = H\check{B} \quad (3)$$

where, $N = [n^1 \; n^2 \; L \; n^K]^T$

The final form of the linear equation must also account for the line bias. The line bias quantity is indistinguishable from the integer ambiguity in the raw measurement, but the combined quantity can be split into an integer part and a fractional part. The integer part can then become part of the N matrix, and the fractional part can be called the line bias term. This notation is advantageous, for it allows for simpler integer ambiguity searches, in which true integers, not real numbers are sought. Since the line bias (l) is common to all the channels, it adds only one more unknown to the linear equation for attitude:

$$\Delta\check{\Phi} + N + L = H\check{B} \quad (4)$$

where, $L = [l \; l \; L \; l]^T$

If the line bias is not known, it can be added to the vector of unknowns $(\check{B})$, and the H matrix can be modified to have a fourth column of ones. However, since it is a value that remains almost constant, it can be determined once and used as a known quantity for some time thereafter. It is also advantageous in terms of accuracy, (due to having better DOP) to use the known line-bias equation with three unknowns (Eq. 4), rather than the unknown-bias solution with four unknowns [8].

B. Integer Ambiguity Determination

There have been many studies and publications about integer-ambiguity determination [3,6–8], and it will only be discussed briefly here. The instantaneous method employed is that used in [8], and is most suitable for applications with short baselines, and where the possible attitude space is restricted, as is the case with an automobile (small pitch and roll).

The length of the baseline is a design parameter that must be chosen to suit the application. Increasing baseline lengths improves attitude accuracy, but expands the integer search space and makes it more difficult to discriminate correct integers from incorrect ones. The studies presented in [8] and [12] show that a baseline length between 40 cm and 60 cm yields attitude accuracy of about 0.5°, and with sufficient error-checking constraints with multiple baselines, can have very reliable integer searches in aircraft applications. To meet the specifications for automobile control applications, a favorable choice for baseline length would be the minimum required for sufficient accuracy, since the expected frequency of integer searches demands the most robust configuration possible. Based on these criteria, 50 cm baselines are used in the current implementation.

With 50 cm baselines and small pitch and roll, the integer search can be performed over the space of possible yaw angles. This relatively small search space is covered in only 35 iterations, with 10° increments in yaw. A guess for the baseline is computed at each iteration (based on the iterated yaw angle), and since the other terms in Eq. 4 are measurements and known quantities, a guess for N can be computed:

$$N_{guess} = round(H\check{B}_{guess} - \Delta\check{\Phi} - L) \quad (5)$$

A test baseline can then be computed from $N_{guess}$, which will not necessarily be close to $$\check{B}_{guess}$$

(due to the rounding in Eq. 5):

$$\check{B}_{test} = (H^T H)^{-1} H^T (\Delta\check{\Phi} + N_{guess} + L) \quad (6)$$

The test baseline is then subject to a number of error checks to verify if the set of integers is correct. These tests include the baseline length (norm of $$\check{B}_{test}$$

), the angles between multiple computed baselines, and the residual. The residual is the most discriminating of the tests [5], and is defined as:

$$res = \left| \Delta\check{\Phi} + N_{guess} + L - H\check{B}_{test} \right| \quad (7)$$

The value of the residual is small when $N_{guess}$ matches the correct integers, and significantly larger when the integers are wrong. This result allows for a constant threshold value to be set for deciding whether the residual value corresponds to the set of correct integers.

After the iterations are completed, the results of all the error tests can be examined to select the set of integers that passes the error tests better than the all other sets of integers. That is, to find a minimum of a cost function in the integer search-space.

When the correct integers are found, the baseline vector can then be computed as shown in Eq. 6. The Euler angles that define the baseline's orientation are then determined from these vector components using simple geometry.

II. GPS Attitude Determination with One Satellite

Figure 2:
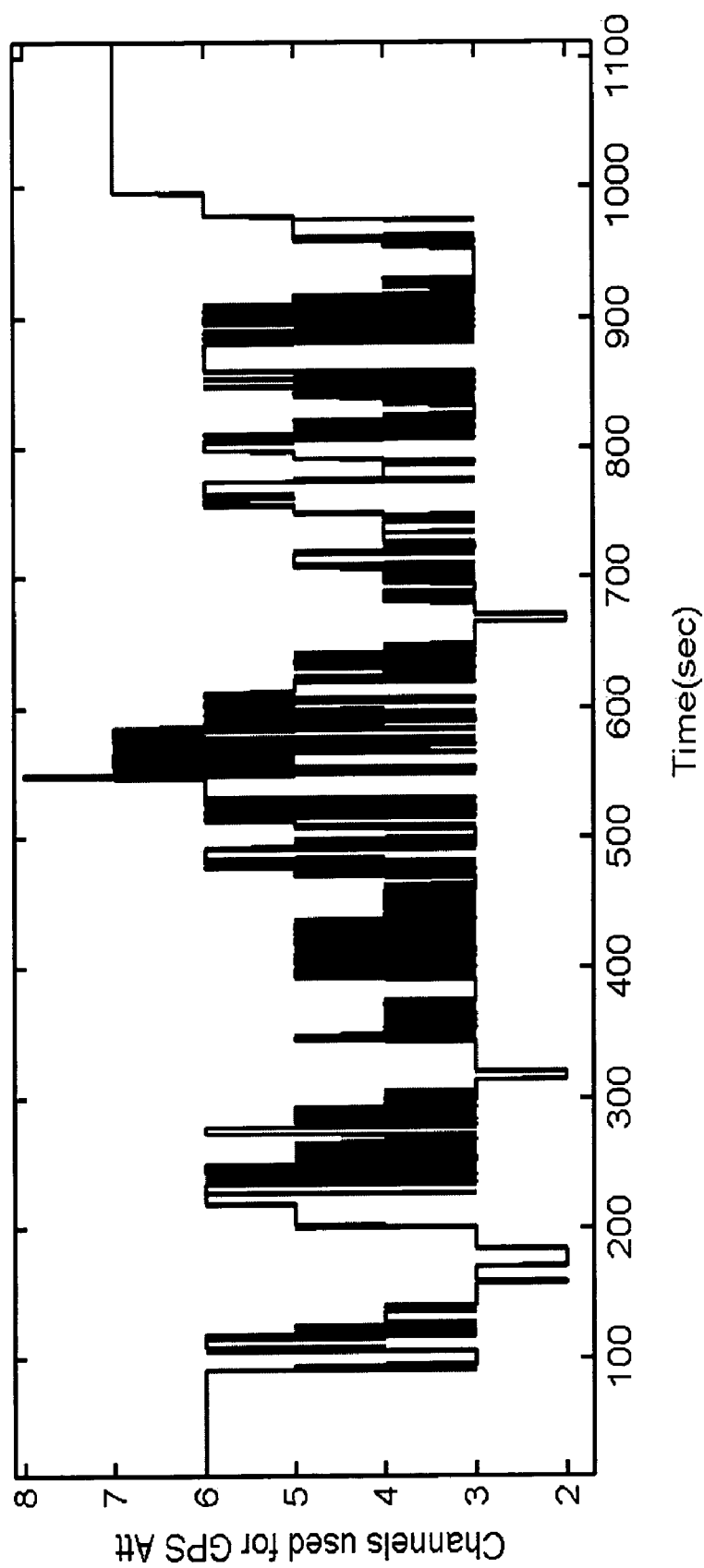
FIG. 2 shows a number of channels tracked and usable for GPS attitude during drive through urban roads.

In an urban street, the number of channels usable for GPS attitude is often below four, or even three, as shown in FIG. 2. With few satellites visible under normal driving conditions, and with the likelihood that at least one of the measurements is noisy, the multiple satellite attitude solution is not sufficient as a reliable source of GPS attitude measurements on a car. This section introduces the concept of determining attitude with a single satellite, which is a valuable advantage when viewed satellites are scarce. Henceforth, the attitude components determined from a single satellite are referred to as the one-satellite yaw, one-satellite roll, or one-satellite pitch.

A. One-Satellite Yaw

If the baseline is assumed to have small roll and pitch (a reasonable assumption in most cases in a car), only yaw defines the orientation of the baseline. With only one unknown, then only one equation is sufficient to obtain a solution.

Figure 3:
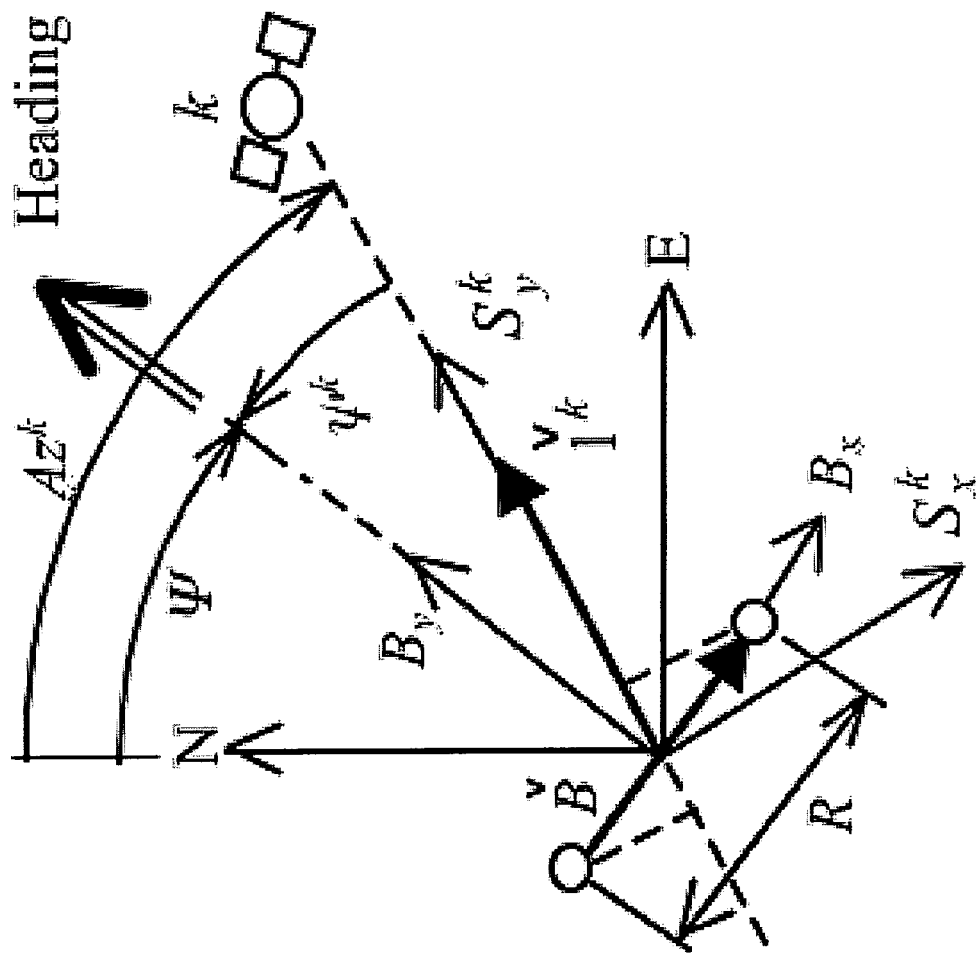
FIG. 3 shows a diagram for one-satellite yaw.

FIG. 3 shows a single baseline parallel to the X body-axis ($B_x$) of a vehicle, and its Y body-axis ($B_y$) is in the general direction of the heading. The satellite's azimuth ($Az^k$) and the vehicle's absolute yaw ($\Psi$) are defined relative to the earth-fixed ENU frame. Note that both of these angles are depicted as negative in FIG. 3, and are defined to be positive CCW.

The one-satellite yaw is most conveniently derived relative to the LOS of the satellite being used. For this purpose, an intermediate coordinate frame is defined in which the y-axis is aligned with the horizontal projection of the LOS. The axes of this coordinate frame (S-frame) are labeled $S_x^k$ and $S_y^k$ in FIG. 3. Thus, if the LOS vector is defined in the ENU frame as $$\underline{1}_E^k = [C_x^k \ C_y^k \ C_z^k]^T \quad (8)$$

then it is defined in the S-frame as $$\underline{1}_S^k = \left[ 0 \ \sqrt{C_x^{k2} + C_y^{k2}} \ C_z^k \right]^T \quad (9)$$

Defining the one-satellite yaw as the angle $\Psi^k$ in FIG. 3, the baseline vector in the S-frame can be expressed in terms its length (R), and $\Psi^k$:

$$\underline{B}_S = [R \cos \Psi^k \ R \sin \Psi^k \ 0]^T \quad (10)$$

Substituting Eqs. 9 and 10 into Eq. 1, and including the integer ambiguity and line bias, the following expression is obtained:

$$\Delta\varphi^k + n^k + l = R\sqrt{C_x^{k2} + C_y^{k2}} \sin\varphi^k \quad (11)$$

Equation 11 can then be solved for the one-satellite yaw:

$$\psi^k = \arcsin\left( \frac{\Delta\varphi^k + n^k + l}{R\sqrt{C_x^{k2} + C_y^{k2}}} \right) \quad (12)$$

Since the possible values for $\Psi^k$ span 360°, Eq. 12 has a dual solution for the yaw angle. Specifically, $\Psi^k$ and $\pi$-$\Psi^k$ have the same sine, so it must be determined whether the satellite is in front of, or behind the baseline to obtain a unique solution for $\Psi^k$.

Figure 4:
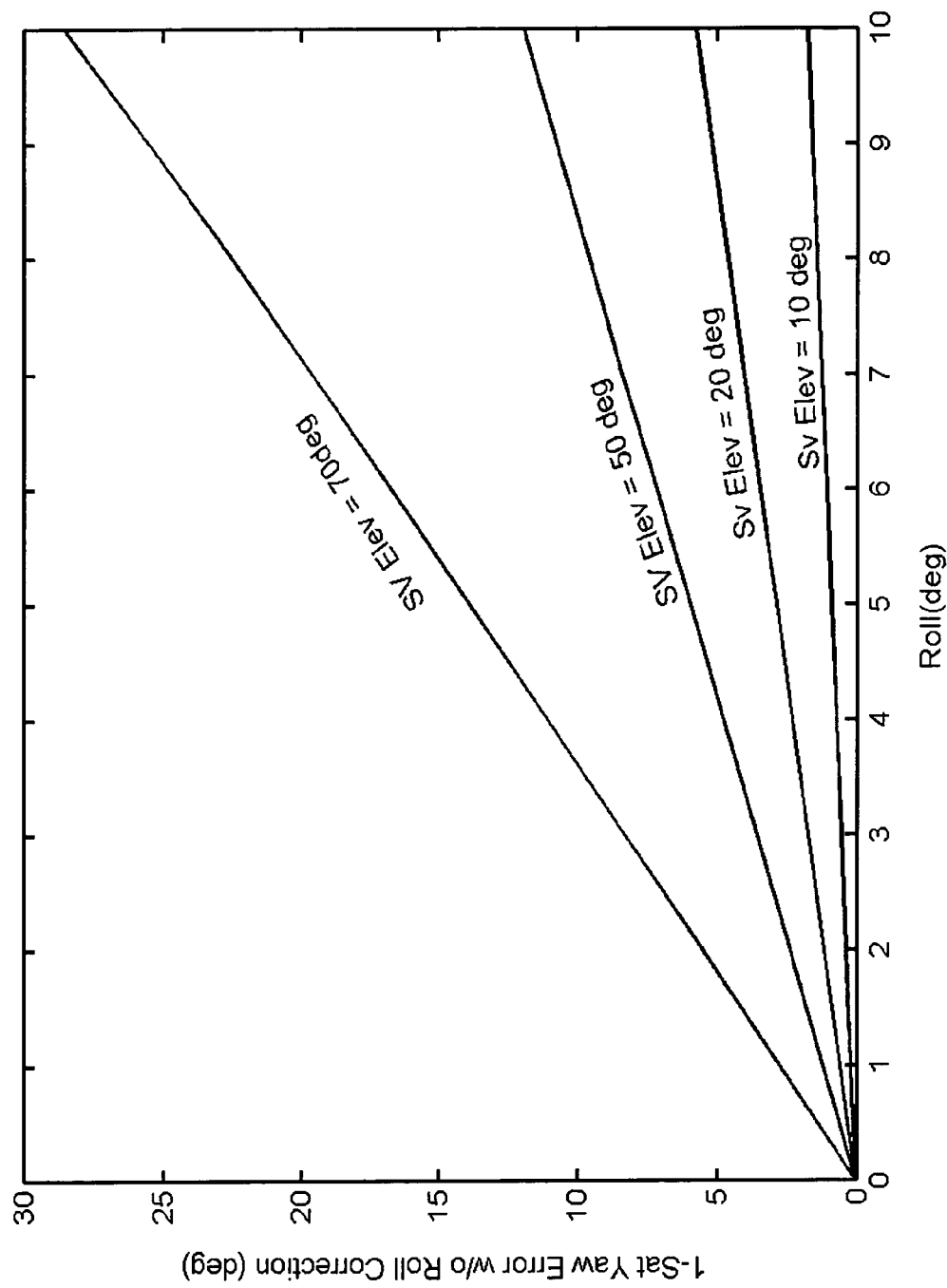
FIG. 4 shows error sensitivity of one-satellite yaw without roll correction.

Equation 12 is derived under the assumption of zero roll. A deviation from this assumption introduces error into the solution for $\Psi^k$, and the error increases with increasing satellite elevation. FIG. 4 shows the error sensitivity of Eq. 12 to nonzero roll angles.

Roll is emphasized here rather than pitch, since the vehicle pitch in FIG. 3 (rotation about $B_x$) is not observable with the one baseline shown. If the roll angle can be estimated for this baseline, it can be used to obtain more accurate one-satellite yaw measurements. The expression for $\underline{B}_s$ (Eq. 10) can be modified by including the roll angle estimate ($\hat{\phi}$):

$$\underline{B}_S = \begin{bmatrix} R\cos\psi^k & \cos\hat{\phi} & R\sin\psi^k & \cos\hat{\phi} & -R\sin\hat{\phi} \end{bmatrix}^T \quad (13)$$

Substituting Eq. 13 for Eq. 10 in the subsequent derivation of the one-satellite yaw results in the following expression to replace Eq. 12:

$$\psi^k = \arcsin\left(\frac{(\Delta\varphi^k + n^k + l) + C_z^k R\sin\hat{\phi}}{R\sqrt{C_x^{k2} + C_y^{k2}}\cos\hat{\phi}}\right) \quad (14)$$

The absolute yaw measurement of the vehicle (based on a single satellite) is obtained readily from the one-satellite yaw obtained from Eqs. 12 or 14, and from the satellite azimuth angle:

$$\phi^k = Az^k + \Psi^k \quad (15)$$

The position of the satellite relative to the baseline is critical for the accuracy of the one-satellite yaw. Equations 12 and 14 have a singularity if the satellite is directly overhead ($C_x=0$, $C_y=0$), and are highly sensitive to noise near that region. The equations are also ill conditioned for satellites for which $\Psi^k$ is near ±90°, where small changes in yaw have little effect on the differential carrier phase and the solution is dominated by noise. Thus, when computing an average of yaw angles based on single measurements (Eq. 15), the measurements should be weighed based on their expected accuracy. The following trigonometric weighting function can be used:

$$W_{yaw}^k = |\cos(\Psi^k)|\cos(\text{elev}^k) \quad (16)$$

Any weighting function used should be truncated to zero when its value is considered low, since it could degrade the accuracy of the GPS measurements and possibly be detrimental to the calibration of an accompanying INS system.

B. One-Satellite Roll and Pitch

Although yaw is the most useful attitude component for automobile applications, roll and pitch are also becoming important for applications such as wheel-slip measurements, vehicle suspension system ID, and experiments that require road-grade estimates [15]. In addition, it was shown in the previous section that roll and pitch estimates can be used to improve one-satellite yaw estimates.

The one-satellite roll will be derived for a baseline with the configuration in FIG. 3, for which pitch is not observable. The idea can be extended to obtain one-satellite pitch if there was a baseline with a nonzero vector component along the $B_y$ axis.

A one-satellite roll measurement can be extracted from the differential carrier phase if the yaw is known. The derivation is similar to that of the one-satellite yaw, except that now the sine of the roll angle is isolated, the current yaw estimate ($\hat{\phi}$)

is used. Since there is no advantage to using the S-frame in this derivation, the baseline vector can be written in the ENU frame:

$$\underline{B}_E = \begin{bmatrix} R\cos\hat{\phi}\cos\phi & R\sin\hat{\phi}\cos\phi & -R\sin\phi \end{bmatrix}^T \quad (17)$$

Note that this equation resembles Eq. 13, but uses the absolute yaw angle rather than the one-satellite yaw. Substituting Eqs. 8 and 17 into Eq. 1, and including the integer ambiguity and line bias, yields $$\Delta\varphi^k + n^k + l = R\left(\cos\phi\left(C_x^k\cos\hat{\phi} + C_y^k\sin\hat{\phi}\right) - C_z^k\sin\phi\right) \quad (18)$$

To solve this equation linearly, a small value for $\phi$ is assumed, and the equation is rearranged to solve for the one-satellite roll:

$$\phi^k \approx \frac{-(\Delta\varphi^k + n^k + l) + R\left(C_x^k\cos\hat{\phi} + C_y^k\sin\hat{\phi}\right)}{RC_z^k} \quad (19)$$

The assumption of small roll used to obtain Eq. 19 is a reasonable approximation for a car, where the roll angle rarely exceeds 5°.

Equation 19 has a singularity if the satellite is at zero elevation ($C_z=0$). Thus, a weighting function is also needed for the one-satellite roll computation, also based on the satellite's elevation:

$$W_{roll}^k = \sin(\text{elev}^k) \quad (20)$$

The attitude estimates used in Eqs. 13-14 and 17-19 are obtained from the filter output (see section VB). Without an INS system, an iteration method could be used in which a one-satellite yaw estimate is determined with Eq. 12, then this value is used to estimate one-satellite pitch and roll with Eq. 19, and these estimates can be used in Eq. 14 to obtain a better estimate of yaw; the process would repeat until convergence is reached.

C. Integer Searches with One Satellite

The nature of the solution for one-satellite attitude requires some modifications to the integer searches. The essential difference is that, for one-satellite attitude, integer searches must be conducted without dependence on other channel measurements, to allow for a single satellite in view to be useful. This difficulty precludes the use of baseline-length and a compound residual measurement as error checks on integers. However, a residual can still be computed for the single equation, and the baseline-angle error-check can also be used, based on the one-satellite yaw values of multiple baselines.

The lack of multiple measurements when searching for integers makes the process more susceptible to error. For this reason, it is advantageous to limit the integer search-space to include yaw angles near a current estimate. Integration with an INS system makes this simplification possible by providing real-time attitude estimates from integrated gyro rates and biases. Assuming that such an estimate ($\hat{\phi}$)

is available, the integer ambiguity can be computed easily from Eqs. 11 and 15:

$$n^k = \text{round}\left(-(\Delta\varphi^k + l) + R\sqrt{C_x^{k2} + C_y^{k2}} \sin(\hat{\phi} - Az^k)\right) \quad (21)$$

For short baselines, this integer does not change for values of $\hat{\phi}$ near the original estimate. For a 50 cm baseline, a margin of 10°–20° is typical. Thus, the search includes checking only one integer, even with an error of a few degrees in the yaw estimate.

The residual test for the integer computed via Eq. 21 can be similarly devised from Eq. 11:

$$res^k = \Delta\varphi^k + n^k + l - R\sqrt{C_x^{k2} + C_y^{k2}} \sin(\psi^k) \quad (22)$$

Nonzero roll angles will have a component in this residual, but if a roll-angle estimate is available, it can be used to refine Eq. 22 in a similar way in which Eq. 14 was obtained.

Besides the residual and angle error checks, an obvious and very effective test for the one-satellite integer is to compare the resulting yaw angle with the known estimate from the attitude filter. That is, if the result of Eqs. 11 or 14 is more than a few degrees different from the trusted estimate, then the integer is likely wrong.

III. Robustness Enhancements

Noisy measurements pose a continuous problem in a dynamic urban road environment. Multipath noise and signal attenuation through trees not only produce large errors in the GPS attitude solution, but can also prevent convergence of integer searches, or even allow convergence to an incorrect set of integers This section covers some of the methods that have been implemented to handle noisy measurements, including identification of noisy channels by residual inspection, taking advantage of baseline redundancy to verify integer ambiguities, and INS-aided integer searches.

A. Identification of Noisy Measurements

The residual quantity, as defined in Eq. 7, is the norm of a vector composed of the residuals from each individual row in the matrix equation. In the context of integer searches, it was used as a check that all integers matched their respective measurements, such that the compound matrix equation had a small noise component. If the integers are already known, a similar idea can be used to identify the presence of a noisy measurement.

When four or more satellites are available, it is useful to solve for a correction to the line-bias estimate ($\Delta l$) by adding it as an unknown to $$\check{B}$$

in the attitude equation:

$$\Delta\check{\Phi} + N + L = H_1 \check{B}_1 \quad (23)$$

where, $$H_1 = \begin{bmatrix} v_1^T & 1 \\ v_2^T & 1 \\ M & M \\ v_k^T & 1 \end{bmatrix}$$

$$\check{B}_1 = [X \quad Y \quad Z \quad \Delta l]^T$$

Assuming a good initial estimate for the line bias, $\Delta l$ will typically be small, on the order of 1 cm. This term is used to track slow changes in line bias [8], but its value also depends on the residuals of the row equations. Since the line-bias correction term is small and changes slowly, any large, short-term deviations in $\Delta l$ can be used to flag noisy conditions for the multiple-satellite solution.

Figure 5:
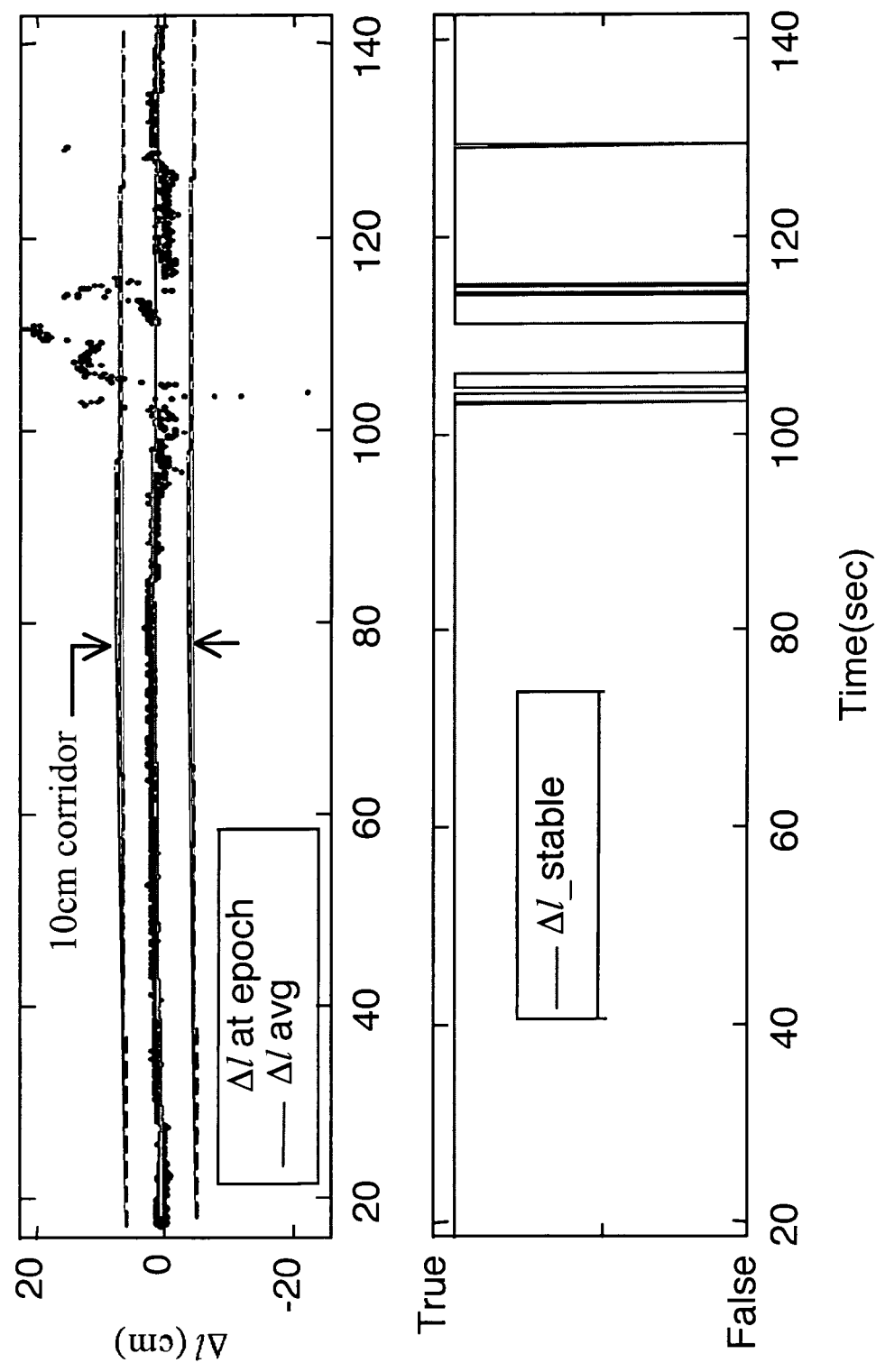
FIG. 5 shows an example of the effect of channel noise on line-bias correction term.

FIG. 5 shows a section of data from a road test, which illustrates this point. The line-bias correction term, as computed by Eq. 23, clearly exhibits erratic behavior between 100 sec and 120 sec.

The second plot shows a flag that toggles to FALSE when $\Delta l$ falls outside a corridor around a running average. The size of the corridor used in this figure was 5 cm on either side of the running average.

The state of the $\Delta l\_stable$ flag shown in FIG. 5 is used as an indicator that noisy measurements may exist. It is then a simple matter to find the noisy channel by inspecting the residual of each individual row of the matrix equation:

$$res^k = \Delta\varphi^k + n^k + l - \begin{matrix} v_k^T v \\ 1 \end{matrix} B \quad (24)$$

This equation can also be used to detect noisy channels with the one-satellite attitude methods, where the line-bias correction is not applicable.

Figure 6:
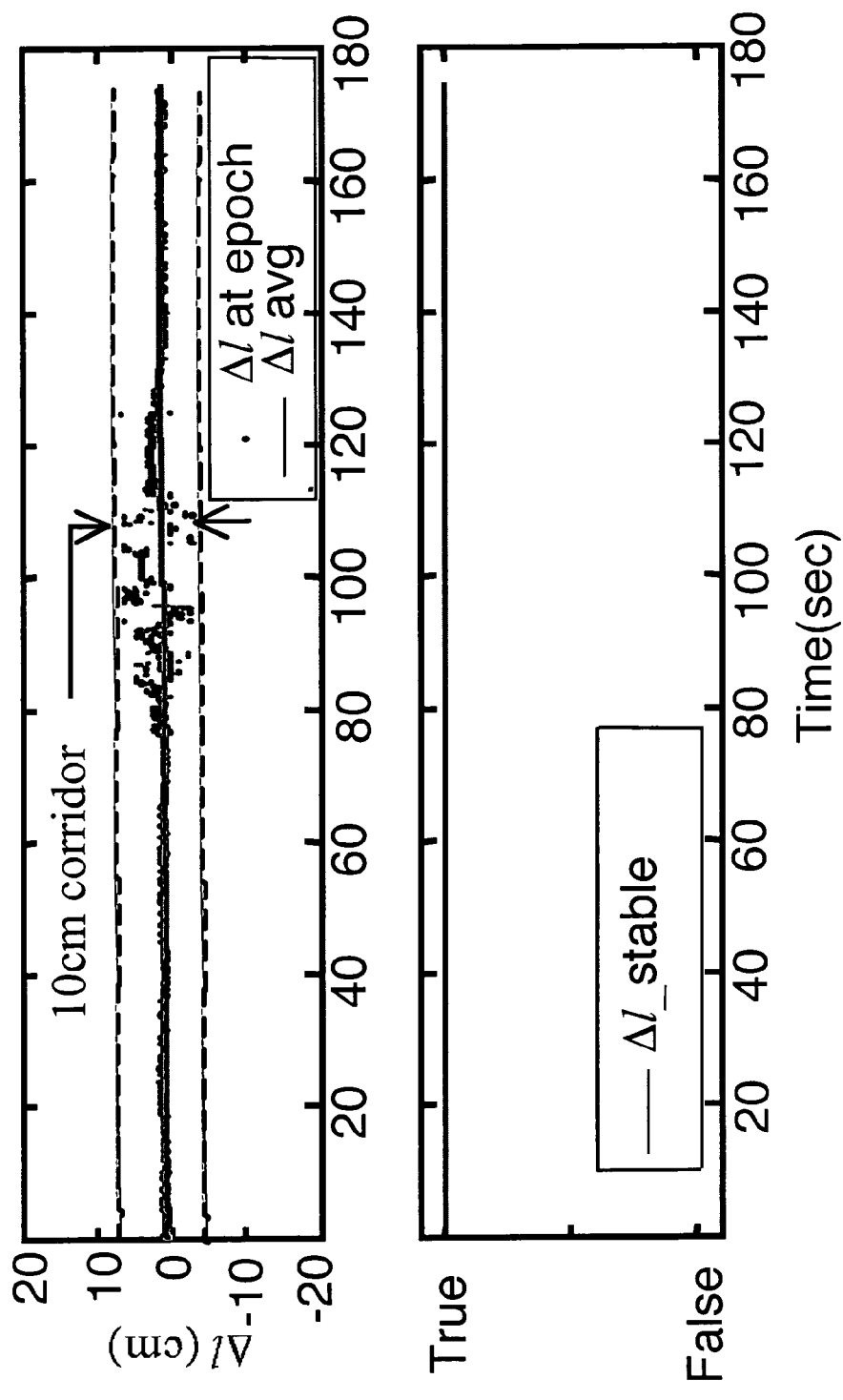
FIG. 6 shows an example of line-bias correction term with noisy measurements removed.

The effect of removing noisy measurements is shown in FIG. 6. The data points for $\Delta l$ now fall within the 10 cm corridor around the running average, since any measurements that cause it to fall outside the corridor are removed.

The scatter of points within the corridor also suggests a larger noise component in other channels that remain in the solution. Thus, the choice of the corridor width is a matter of establishing a threshold on what is considered a noisy measurement based on residual inspection. The choice used here (10 cm) was based on empirical data, and establishing an acceptable noise level that did not affect the attitude solution significantly.

B. Baseline Redundancy

Thus far, the topic of multiple baselines has been addressed only in respect to baseline-angle error checks for integer ambiguities and pitch measurements. In addition, a triangular three-baseline configuration provides the benefit of redundancy, which can be exploited for enhanced robustness.

Figure 7:
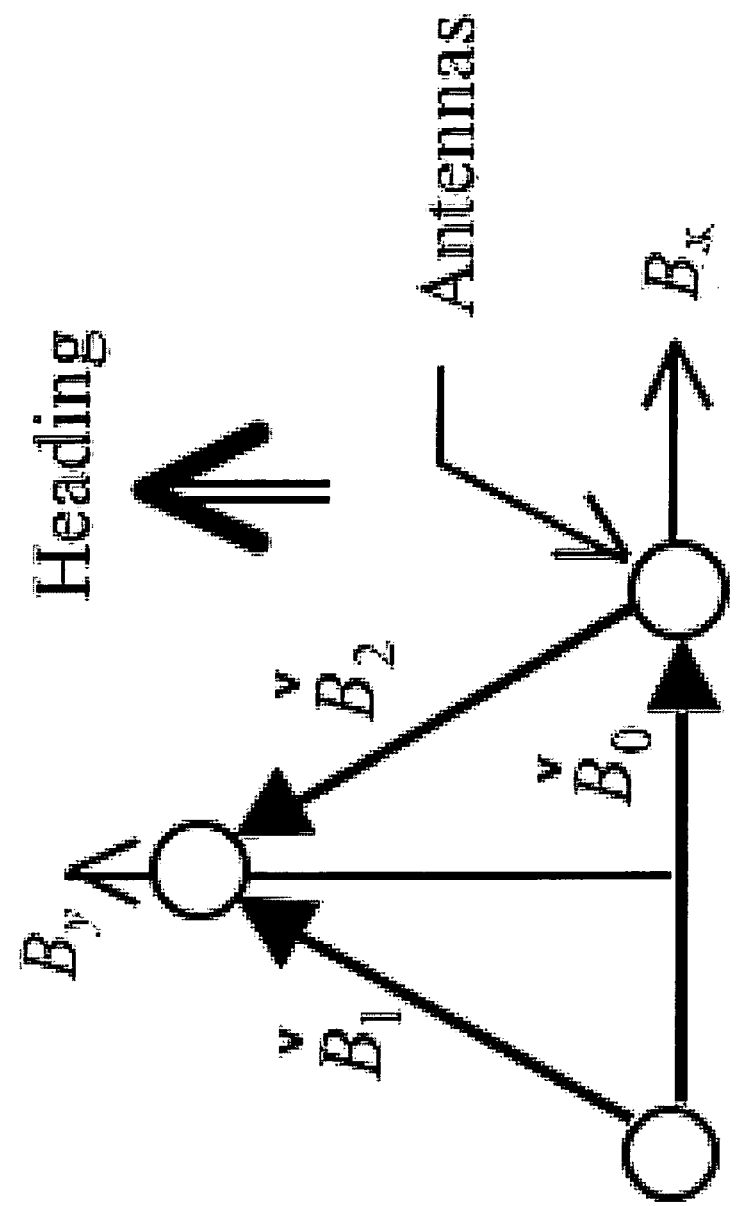
FIG. 7 shows an example of a three-baseline configuration.

FIG. 7 shows such a triangular baseline configuration on the body axis of a vehicle, where $$\check{B}_0$$

is the same as the baseline used in the preceding sections.

The current system could include a similar setup. Since the baselines are treated as vectors in the attitude computations, any one baseline can be determined from the sum (or difference) of the other two. Specifically for the baselines depicted in FIG. 7, the relationship is $$\check{B}_1 = \check{B}_0 + \check{B}_2 \tag{25}$$

The projections of these baselines onto a LOS unit vector have a similar relationship:

$$1^{k^T}\check{B}_l = 1^{k^T}\check{B}_0 + 1^{k^T}\check{B}_2 \tag{26}$$

Recalling the connection of these vector projections to differential carrier phase (Eq. 1), and including the integer ambiguities added in Eq. 3, an equation can be written relating the raw measurements and the integers for the three baselines, for a given satellite:

$$\Delta\phi_1{}^k + n_1{}^k = (\Delta\phi_0{}^k + n_0{}^k) + (\Delta\phi_2{}^k + n_2{}^k) \tag{27}$$

Note, the subscripts on the terms in this equation denote the baseline index.

Equation 27 imposes an additional constraint on the integer ambiguities, which is useful to further verify that the integers are correct for all the baselines. The relationship is also used occasionally to determine the integers for a baseline, when the noise conditions prevent convergence for one baseline, but not for the other two.

C. INS-Aided Integer Searches

The discussion involving Eq. 21 described how an estimate of the current attitude simplified the integer searches for one-satellite yaw. This strategy is very powerful if the attitude estimate is provided by a coupled INS system. Among other benefits, the GPS/INS system provides continuous attitude estimates with sufficient accuracy so as to make convergence to wrong integers very unlikely.

The attitude estimate aids the integer searches by first providing a starting point for the search, and by providing a check of the GPS attitude solution obtained with the new integers. In some cases, the heading angle based on the velocity vector can also be used as an aid for the search [13]. The process for determining the integers with the attitude estimate is the same as in Eq. 5, but the guess for the baseline $$(\hat{B})$$

would actually be an estimate obtained from the attitude filter outputs:

$$N_{guess} = \text{round}\left(H\hat{B} - \Delta\check{\Phi} - L\right) \tag{28}$$

For a short baseline, these integers would not change in the neighborhood of the baseline estimate, so it is not necessary to check any other set of integers. The test baseline obtained with these integers would also be subject to the error tests discussed in section IIB, and further tested by comparing it with $$\hat{B}.$$

IV. GPS—INS INTEGRATION

A. Filtering Algorithm

The GPS and INS measurements are combined using a constant-gain filter. The filter design in [8–10] was used as a model. The state of the filter includes the three Euler angles and the gyro biases, as follows:

$$\hat{x} = [\hat{\theta}\ \hat{\phi}\ \hat{\psi}\ \delta\hat{q}\ \delta\hat{p}\ \delta\hat{r}]^T \tag{29}$$

The first three states are pitch, roll and yaw estimates and the last three are the pitch, roll and yaw rate-gyro biases.

To provide the state estimate, the filter integrates the gyro rates and biases while constantly updating the estimates of the gyro biases whenever GPS measurements are available. In general, the integration of Euler angles from body rates is a nonlinear process with nonzero pitch and roll. The relationship between body rates and Euler-angle rates is as follows [10]:

$$\begin{bmatrix} q \\ p \\ r \end{bmatrix} = \begin{bmatrix} \cos\phi & 0 & -\sin\phi\cos\theta \\ 0 & 1 & \sin\theta \\ \sin\phi & 0 & \cos\phi\cos\theta \end{bmatrix} \begin{bmatrix} \dot{\theta} \\ \dot{\phi} \\ \dot{\psi} \end{bmatrix} \tag{30}$$

With small pitch and roll, the matrix in this equation can be approximated with the identity matrix, and the Euler-angle integration equations become uncoupled. In typical driving conditions, the roll and pitch of the vehicle rarely exceed 5°, allowing this approximation to be used without appreciable loss of accuracy.

Including the gyro biases, the approximate relationship between Euler rates and body rates, with small pitch and roll, can be written as $$\dot{\theta} \approx q + \delta q$$

$$\dot{\phi} \approx p + \delta p$$

$$\dot{\psi} \approx r + \delta r \tag{31}$$

The input vector to the filter includes the biased body rate measurements, obtained from the gyros:

$$u = [q\ p\ r]^T \tag{32}$$

The measurement vector contains the attitude measurements from the GPS system, either multiple-satellite or averaged one-satellite solutions:

$$y = [\theta_{gps}\ \phi_{gps}\ \psi_{gps}]^T \tag{33}$$

With these definitions, and utilizing the approximations of Eq. 31, a standard linear filter can be used. The use of a linear filter is a slight deviation from the extended filter described in

[8–10], where the full nonlinear integration of Euler angles is employed. The linear filter is implemented in discrete form as follows:

State Propagation:

$$\hat{x}_{k+1}(-) = F\hat{x}_k(+) + Gu_k \quad (34)$$

Meas. Update:

$$\hat{x}_k(+) = \hat{x}_k(-) + L(y_k - H\hat{x}_k(-)) \quad (35)$$

where, $$F = \begin{bmatrix} I_{3\times3} & \Delta t I_{3\times3} \\ 0_{3\times3} & I_{3\times3} \end{bmatrix} \quad (36)$$

$$G = \begin{bmatrix} \Delta t I_{3\times3} \\ 0_{3\times3} \end{bmatrix} \quad (37)$$

$$H = [\, I_{3\times3} \quad 0_{3\times3} \,] \quad (38)$$

The gain matrix L was chosen empirically to achieve acceptable settling times and error variance on the state estimates. For the notation in these filter equations, the subscript k indicates time-steps for both equations 34 and 35, and implies the same sampling rate for GPS and INS.

In many systems, however, the INS is added to improve the system bandwidth [5,8], and is sampled faster than the rate of GPS measurements. In this system, the GPS attitude is processed at 10 Hz, while the gyros are sampled at 100 Hz, giving the system sufficient bandwidth for most automobile applications. Equation 34 can be modified to accommodate different sampling rates by propagating the state at each sample of the gyros:

$$\hat{x}_{k+1,j+1}(-) = F\hat{x}_{k+1,j}(-) + Gu_j \quad (39)$$

The subscript j denotes time steps of the INS samples in between GPS updates, and the subscript k corresponds to GPS time steps. With each GPS update, Eq. 35 is updated, the j index would be reset to zero, and the next propagation step would begin with $$\hat{x}_{k+1,0}(-) = \hat{x}_k(+) \quad (40)$$

B. Integration

Both the GPS multiple-satellite and one-satellite attitude solutions have characteristics that make them useful. When more than four satellites are in view, the multiple-satellite solution usually has better accuracy and has the capability to monitor slow changes in line bias. The one-satellite attitude solution is more robust in noisy environments due to the separation of the channels in the solution, and with fewer than three or four satellites, it is the often the only solution available. The union of these two separate modules into a single GPS subsystem requires a monitoring system to switch between the two, and to decide whether any GPS measurements are valid at all. This integrity monitor takes various inputs from the multiple-satellite and one-satellite GPS modules, as well as feedback from the filter output.

Figure 8:
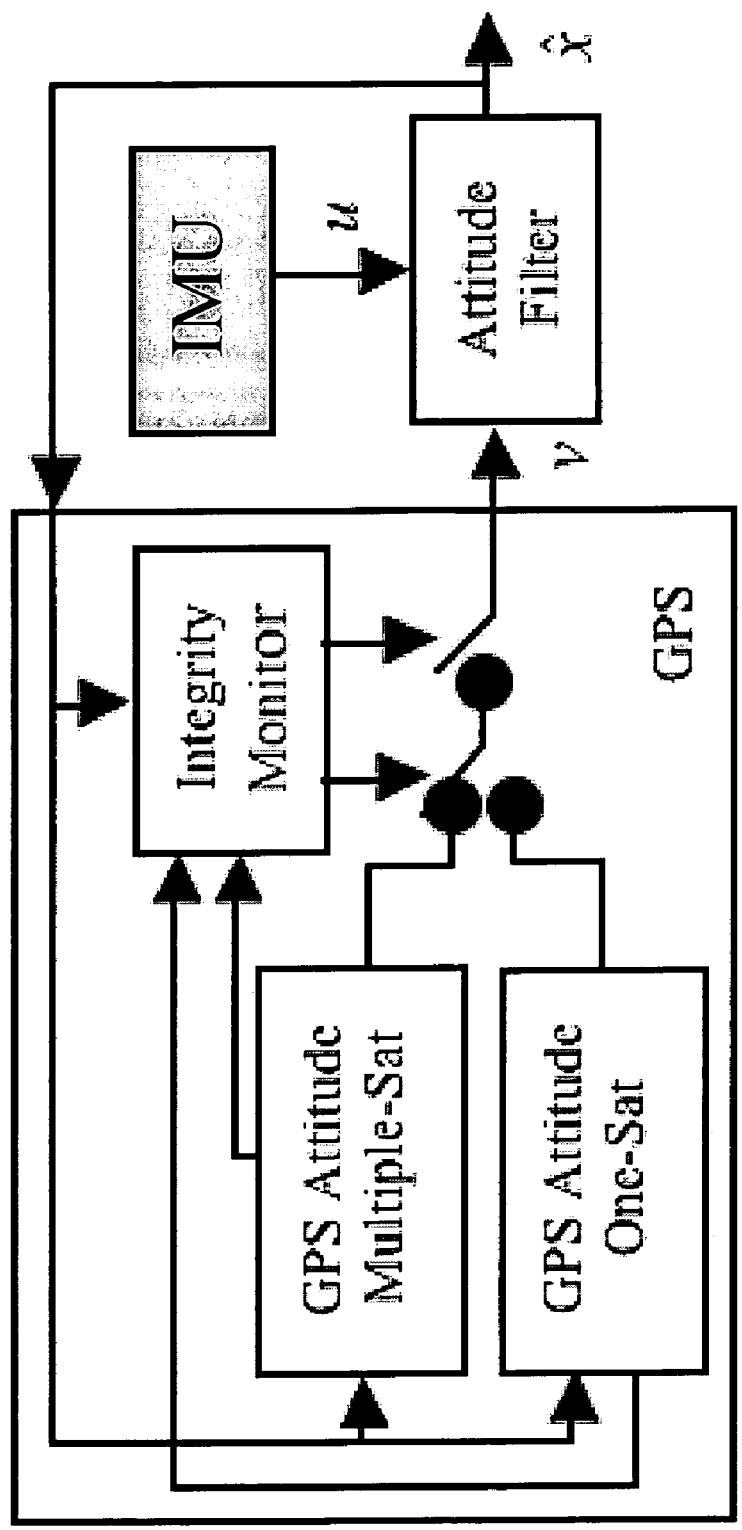
FIG. 8 shows an schematic example of system integration (IMU=inertial measuring unit).

FIG. 8 depicts the integration of the various subsystems. The feedback path from the filter is shown to continue on to the multiple-satellite and one-satellite modules, since the current attitude estimates are used for various aspects of the GPS attitude computation, as discussed in preceding sections.

V. Realization

A. Inertial Sensors

Figure 9:
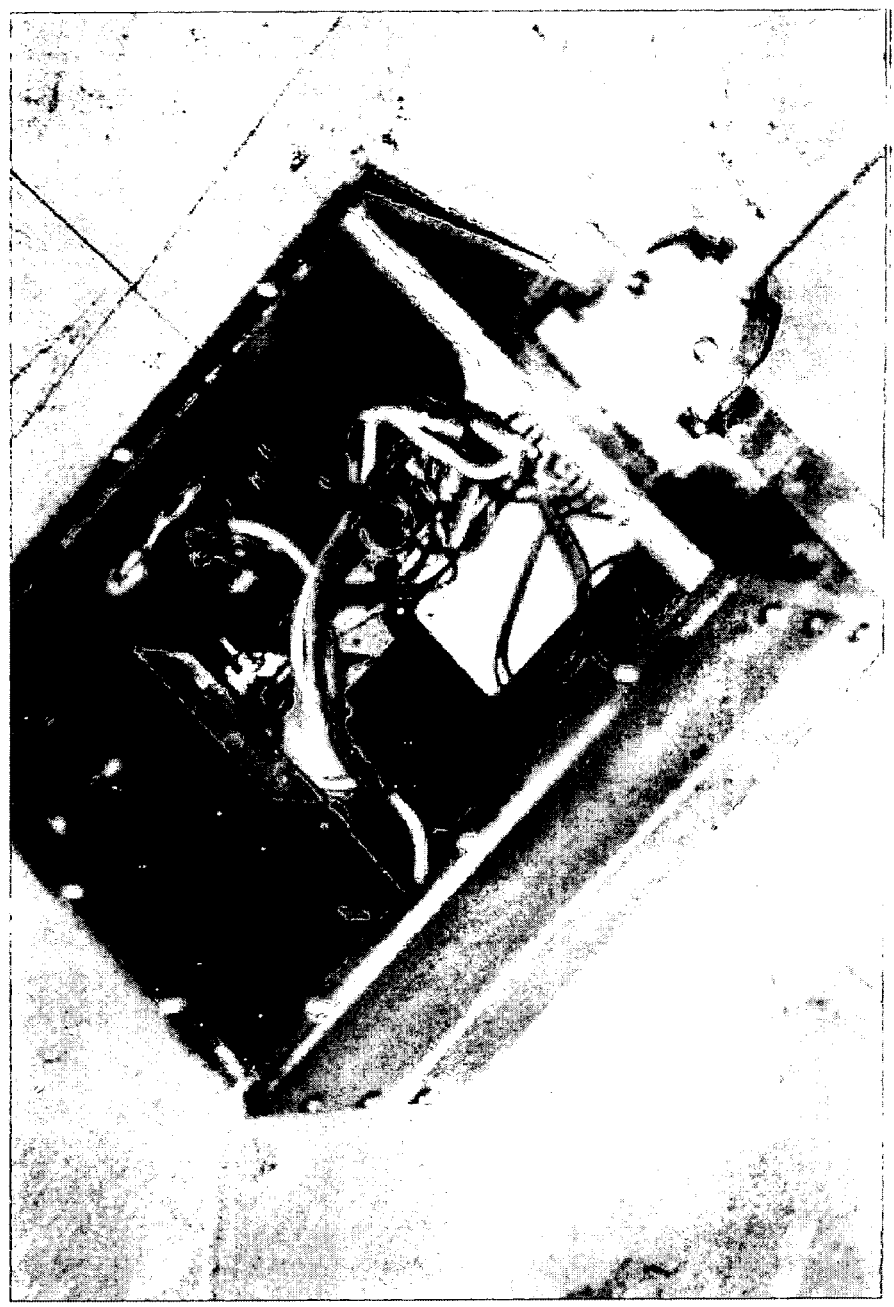
FIG. 9 shows Bosch DRS-MM1 yaw-rate sensors in INS assembly.

The inertial sensors used are Bosch DRS-MM1 yaw-rate sensors. Each unit contains one yaw-rate sensor and one accelerometer. These sensors are used widely in automobile applications, and are characterized by high sensitivity, small temperature drift, and long-term stability [14]. Three of these yaw-rate sensors were used to assemble an INS system capable of measuring three body rates. The assembly is shown in FIG. 9.

B. GPS Receivers

The GPS units used in a prototype system are three Canadian Marconi Allstar receivers on a common reference oscillator. The output messages from the receivers are TTL-level signals designed for serial-port communication with a computer. The use of these Allstar receivers for attitude determination is introduced in [4], and further developed in [12]. The antennas used are inexpensive, 26 dB active, vehicle-tracking Micropulse antennas (32000 series).

Figure 10:
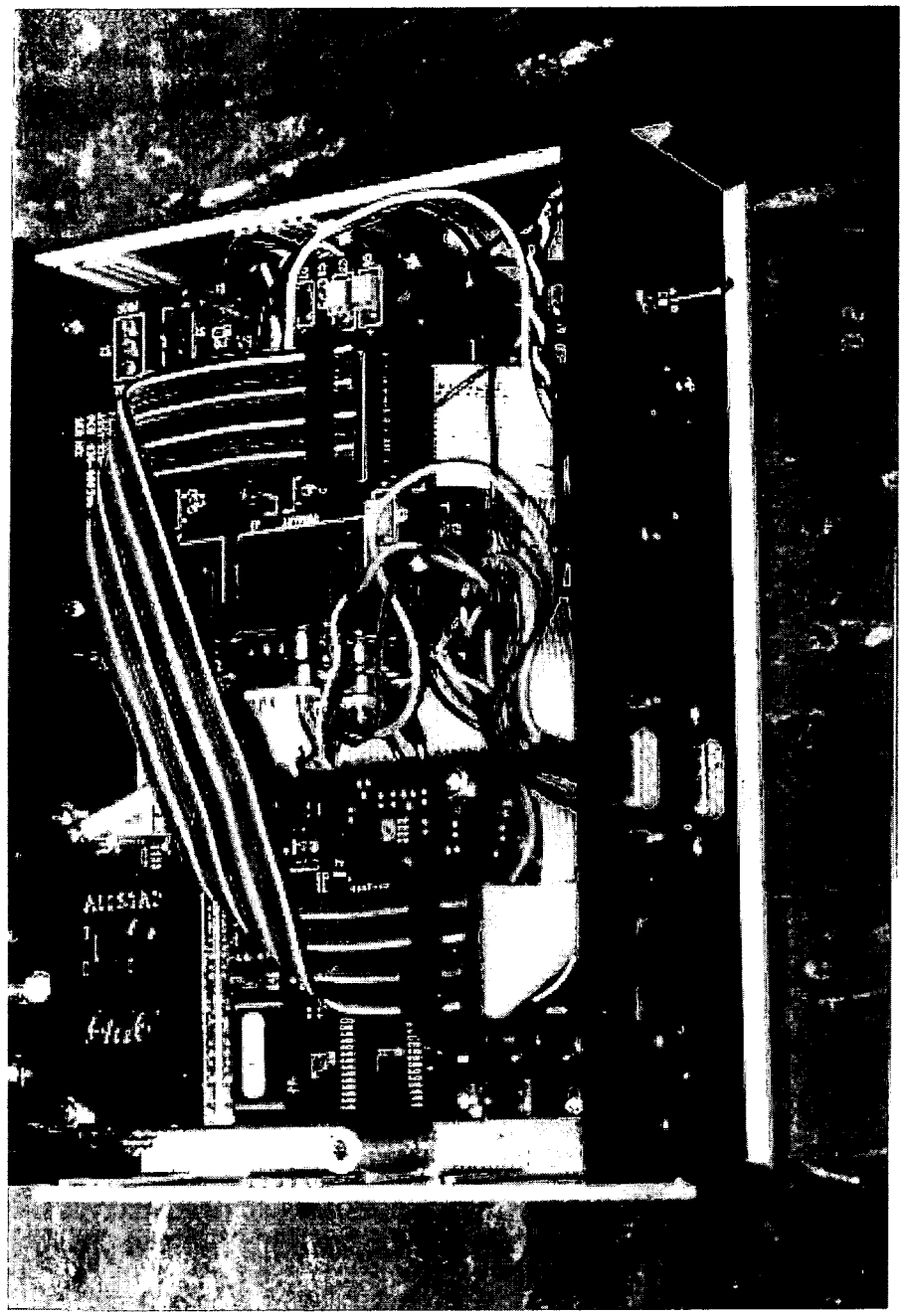
FIG. 10 shows a GPS receivers box.

FIG. 10 shows a picture of GPS sensor box, containing the three receivers and boards to provide power and process the receivers' TTL signals to RS232 voltage levels.

B. Computer Hardware and Software

All computations and data storage are done on a 500 Mhz laptop running Windows 2000. A Quatech QSP-100 PCM-CIA card is used to provide the additional serial ports needed to communicate with the GPS receivers. The INS sensors are sampled with Quatech DAQP-16 PCMCIA card, in differential channel mode.

Figure 12:
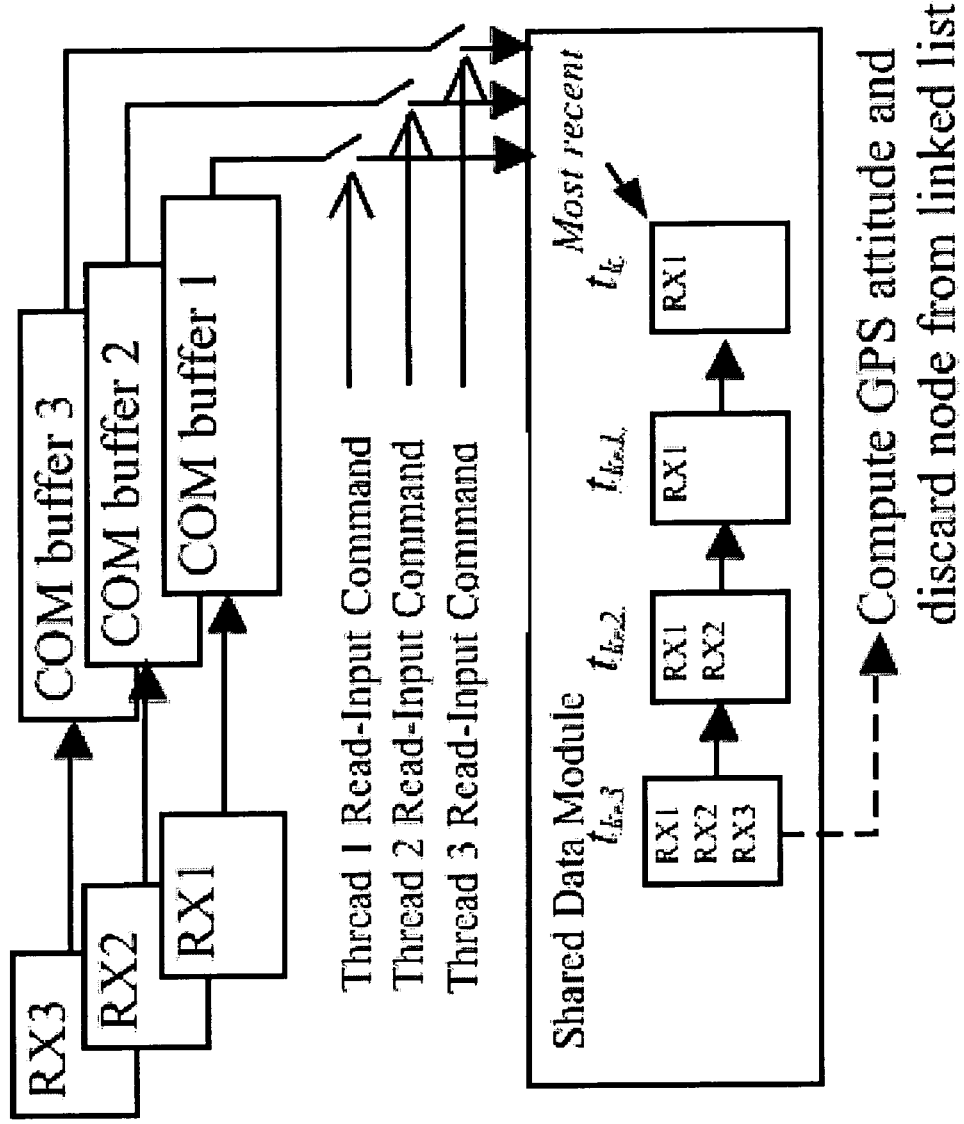
FIG. 12 shows an example of GPS data synchronization.

To handle inputs from multiple serial ports as fast as possible without missing data packets, the software was implemented with multiple threads, where each thread handles I/O from one serial port. A shared-data module contains a linked-list data structure, whose nodes store concurrent packets of data from the receivers. When data is collected from all receivers at the same epoch, then the GPS attitude can be computed. This data-flow process is illustrated in FIG. 12. The 10 Hz carrier-phase data is collected fast enough so that the most recent node of the linked list is placed practically in real time.

The user interface that is used for design and testing of the attitude system is a custom Windows application, which displays attitude information and program status in graphical form.

The hardware and software components described thus far are used primarily for development, and are not designed to interface with practical applications that would use the system for control or navigation. An alternate hardware and user-interface setup was implemented for this purpose, with a two-antenna duplicate of the system. The hardware includes a target computer running QNX to execute all software and connect with other system hardware, and a host computer for programming development and user interface. The host and the target are linked by an Ethernet connection, and the communication is managed by OPAL RT software. With this setup, the system development and user interface were done with Simulink (The Mathworks, Inc.).

VI. System Performance

A. GPS Attitude Accuracy

Figure 13:
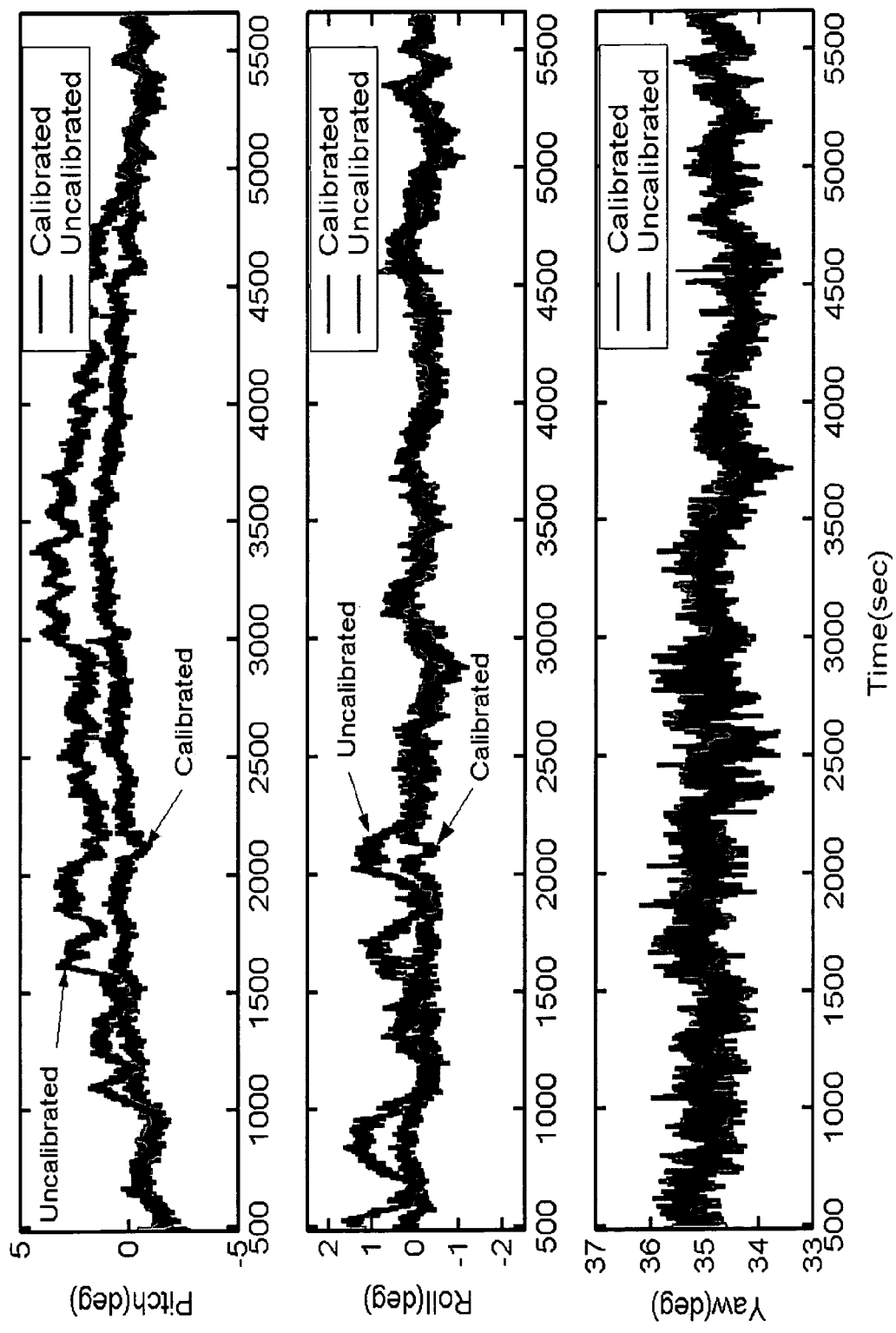
FIG. 13 shows examples of GPS attitude accuracy with and without phase-delay calibration.

The accuracy of GPS attitude depends on several factors, including baseline length, channel noise, number of satellites in view, and antenna phase-delay calibration. The calibration process discussed in [11] was used to map the phase-delay of the antennas, and it was verified that this error can be on the order of a several centimeters in each channel. FIG. 13 shows plots of static GPS attitude, with and without the phase delay calibrated. The plots were generated with the same platform attitude ($\theta=0°$, $\phi=0°$, $\Psi=35°$) and exactly two orbit periods apart, to ensure similar satellite geometry relative to the baselines.

The benefit of calibration on the pitch and roll measurements is clear, but the effect on the yaw measurement is negligible. This result is primarily due to the method used for measuring the reference attitude during the calibration. The reference yaw angle used to determine the phase errors was the filter output based on uncalibrated multiple-satellite GPS yaw, whereas the pitch and roll reference angles were determined with a pair of calibrated accelerometers measuring the gravity vector. This method is consistent with something that can be implemented on a car to calibrate antennas after installation (without additional sensors), but has the disadvantage of not fully calibrating the phase delay of low-elevation satellites, as suggested by the remaining correlation of the yaw noise in FIG. 13.

Figure 11:
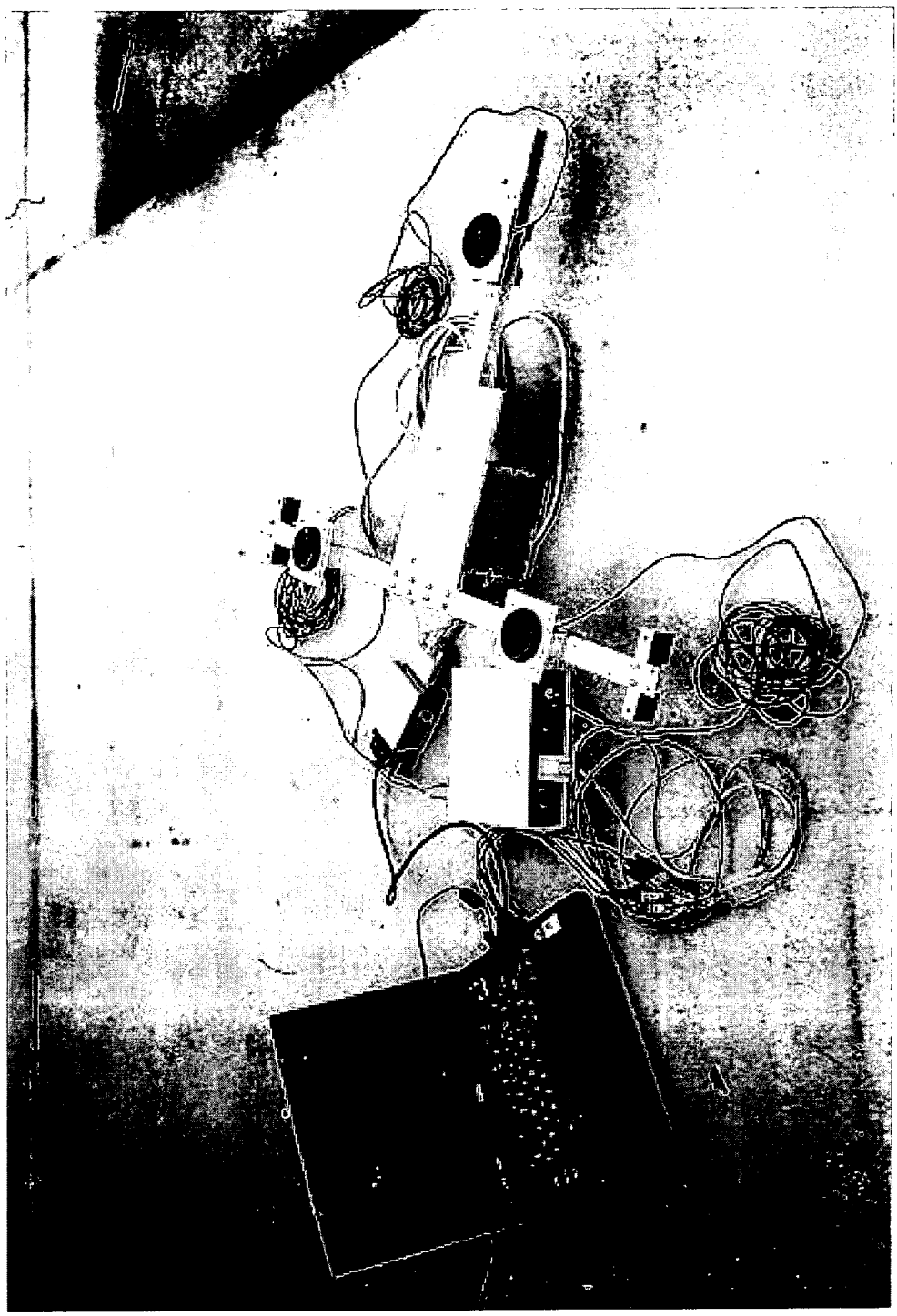
FIG. 11 shows an example of the hardware used to test the system on a vehicle, and illustrates its portability.

The antenna configuration used (see FIGS. 7, 11) is more suitable for measuring roll than pitch, and it is expected that the pitch accuracy be worse than that of roll. The multiple-satellite GPS attitude noise statistics (variance) for the system with calibrated phase delay are:

$\sigma_{pitch}^2=0.50$ cm$^2$, $\sigma_{roll}^2=0.15$ cm$^2$, $\sigma_{yaw}^2=0.13$ cm$^2$.

Figure 14:
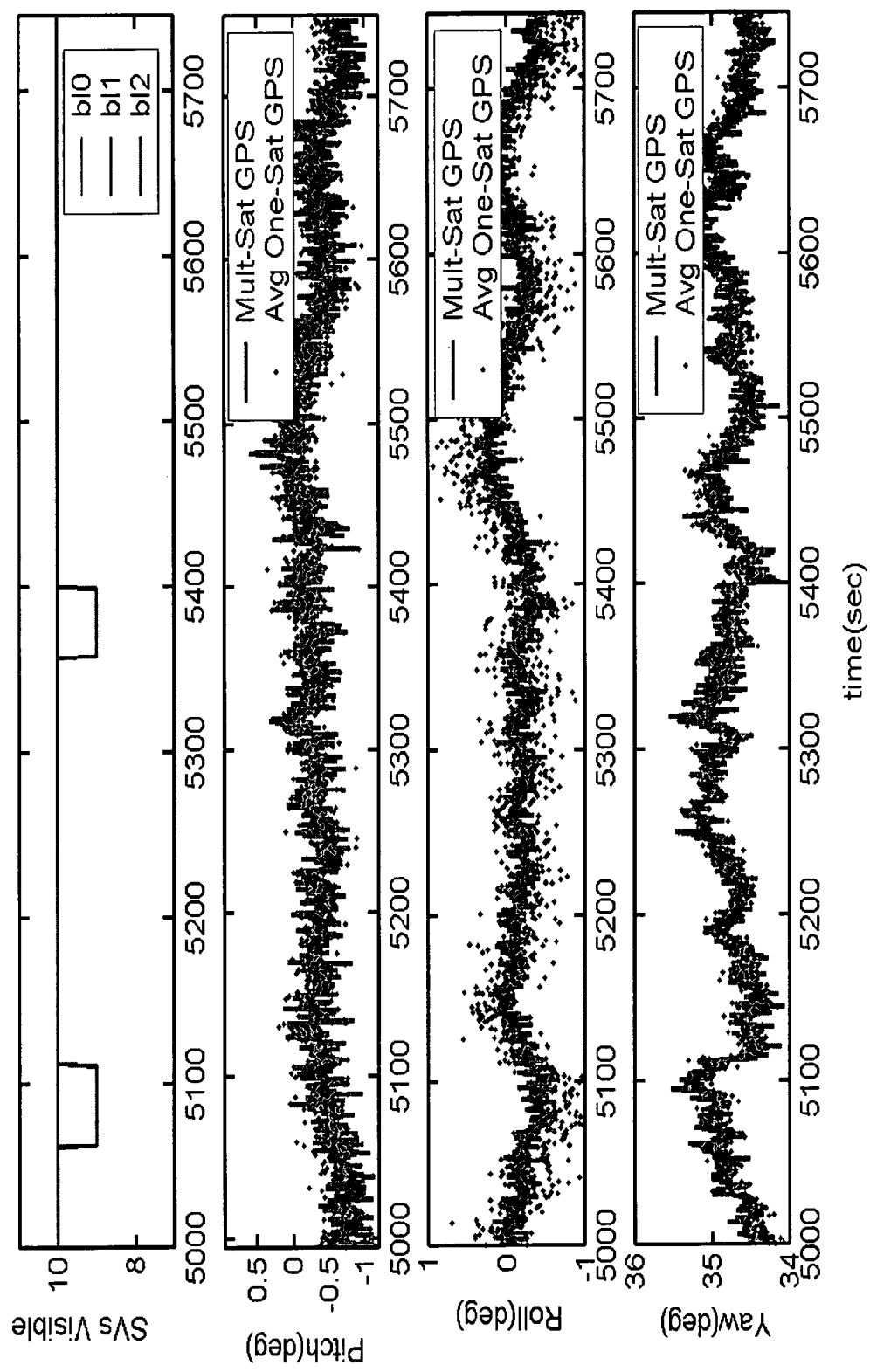
FIG. 14 shows multiple-satellite and one-satellite GPS attitude data.

With several satellites in view, the average one-satellite attitude accuracy is comparable to the multiple-satellite. In fact, the two solutions can be nearly identical. FIG. 14 shows a comparative plot of both GPS solutions. These graphs were generated without the phase-delay calibration, to illustrate how phase delay errors tend to affect both solutions equally in all three angle measurements.

Figure 15:
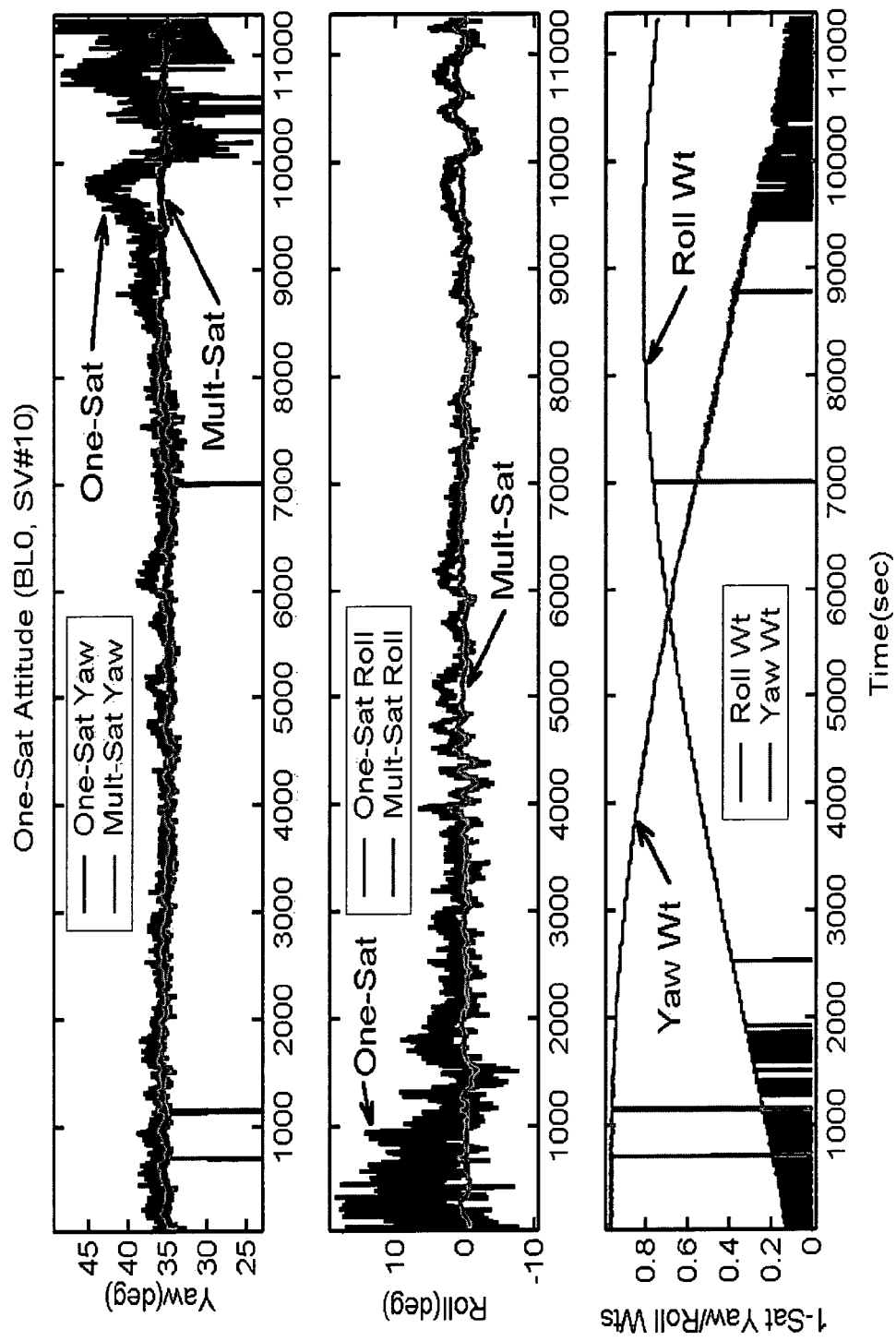
FIG. 15 shows one-satellite GPS attitude data.

With few satellites in view, the noise level of the one-satellite attitude may increase, depending on the number of satellites and their positions. FIG. 15 shows the one-satellite attitude measurements for SV#10 over a period of 3 hours, and the multiple-satellite attitude for comparison. The solutions are clearly worse when the satellite is in poor position, as indicated by its weights (third plot), and determined per Eqs. 16 and 20.

B. Filter Performance

Figure 16:
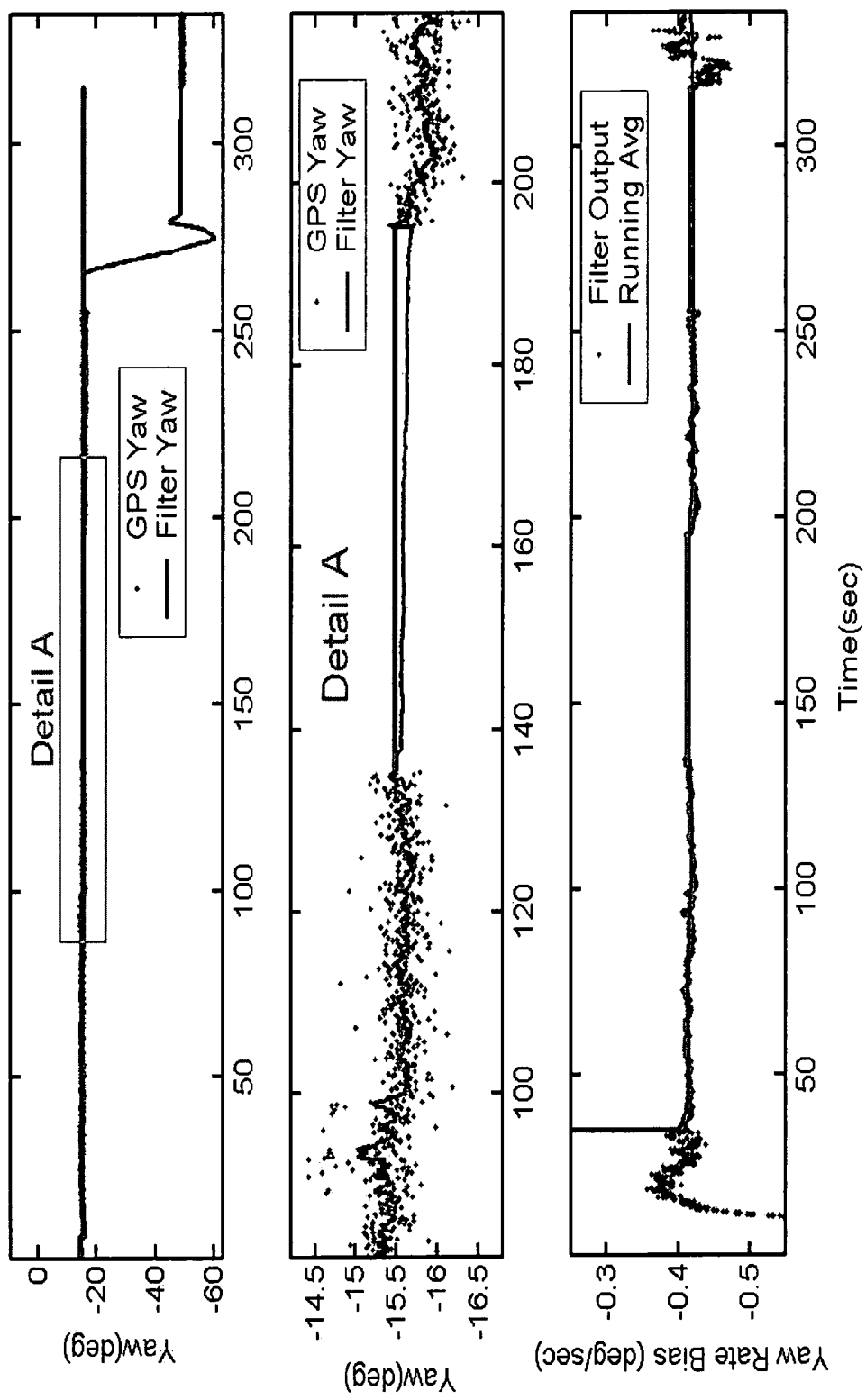
FIG. 16 shows filter yaw output data.

The filter performance should be assessed with and without GPS measurements. When GPS measurements are available, the criteria for evaluation include reduced noise on the attitude measurements, and small noise in the gyro bias estimates. An accurate value of the gyro-bias estimates is particularly important during GPS outages, where the attitude measurements are based only on integrated gyro rates and biases. FIG. 16 shows plots of the yaw filter outputs with and without GPS measurements.

The GPS updates were deliberately turned off for one minute at t=135 and t=255; the baselines were left still during the first outage, and rotated during the second outage. As shown in the detail, the filter output drifts very little without GPS. This low drift value depends on having a very good estimate of the gyro biases. For this purpose, it is useful to maintain a running average of the gyro biases to further reduce the noise in the estimates, and use this average during GPS outages. The third plot in FIG. 16 shows the running average for the yaw-rate bias estimate. An alternative is to use lower gains on the gyro-bias measurement updates (Eq. 35), as is done in [10].

C. Robustness Performance

Figure 17:
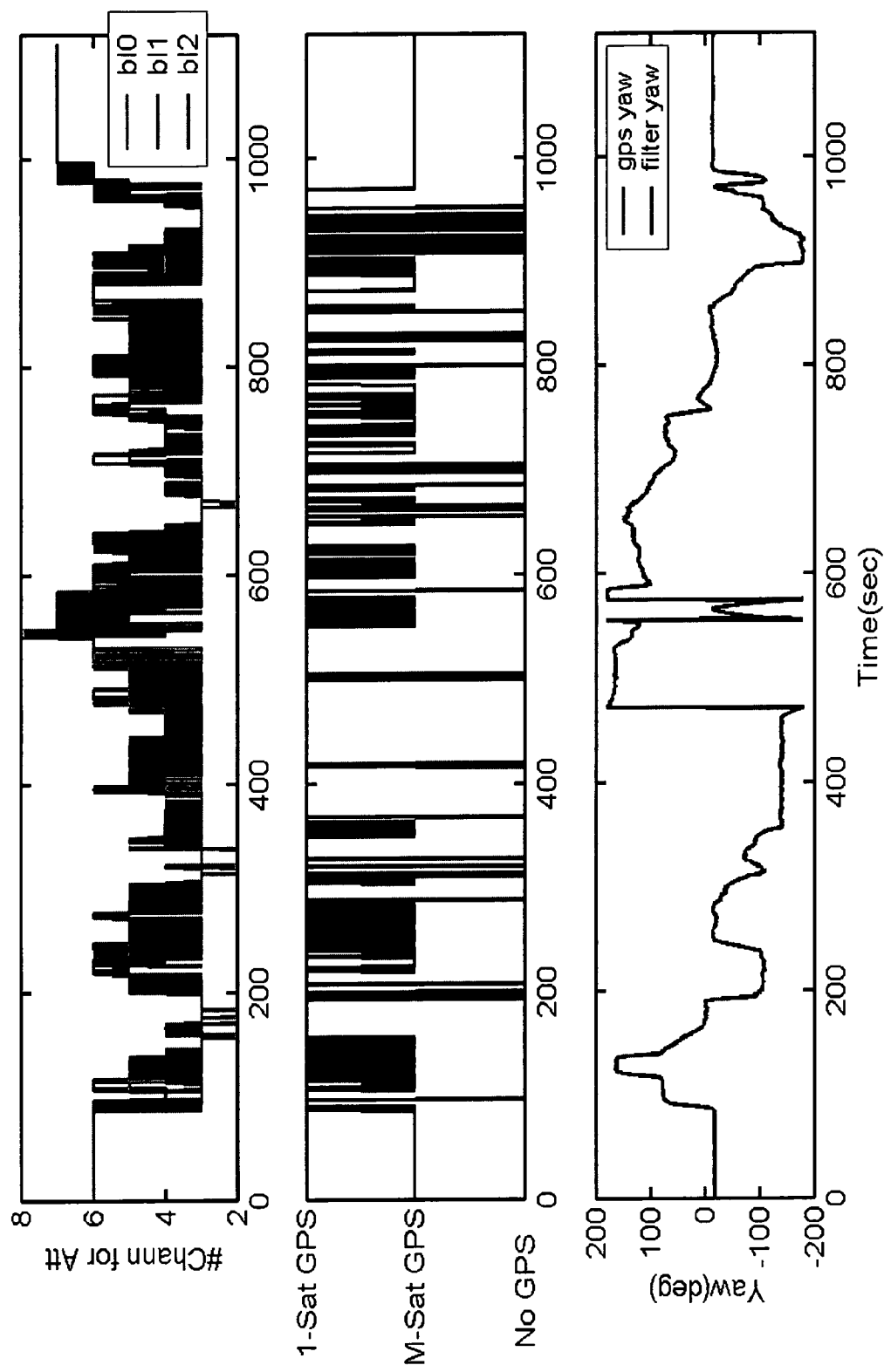
FIG. 17 shows yaw angle measurements with robustness enhancements.

FIG. 17 shows yaw-angle data taken during a test drive. The second plot indicates whether the multiple-satellite or one-satellite attitude solution is being used for yaw, or if no solution is available. As shown, the one-satellite yaw is used a significant amount of time when there are few satellites in view or the multiple-satellite solution has difficulty converging.

Table 1 shows some approximate statistical data relevant to GPS attitude availability on the road, compounded from several test-drives, totaling about 1 hour.

TABLE 1

| GPS Availability and Outage Statistics | | | | |
|---|---|---|---|---|
| Mult-Sat GPS (% time) | One-Sat GPS (% time) | No GPS (% time) | Avg Outage Time (sec) | Longest Outage Time (sec) |

| | Mult-Sat GPS (% time) | One-Sat GPS (% time) | No GPS (% time) | Avg Outage Time (sec) | Longest Outage Time (sec) |
|---|---|---|---|---|---|
| Pitch | 50% | 36% | 14% | 0.5 | 11 |
| Roll | 50% | 38% | 12% | 0.4 | 11 |
| Yaw | 50% | 45% | 5% | 0.1 | 8 |

Figure 18:
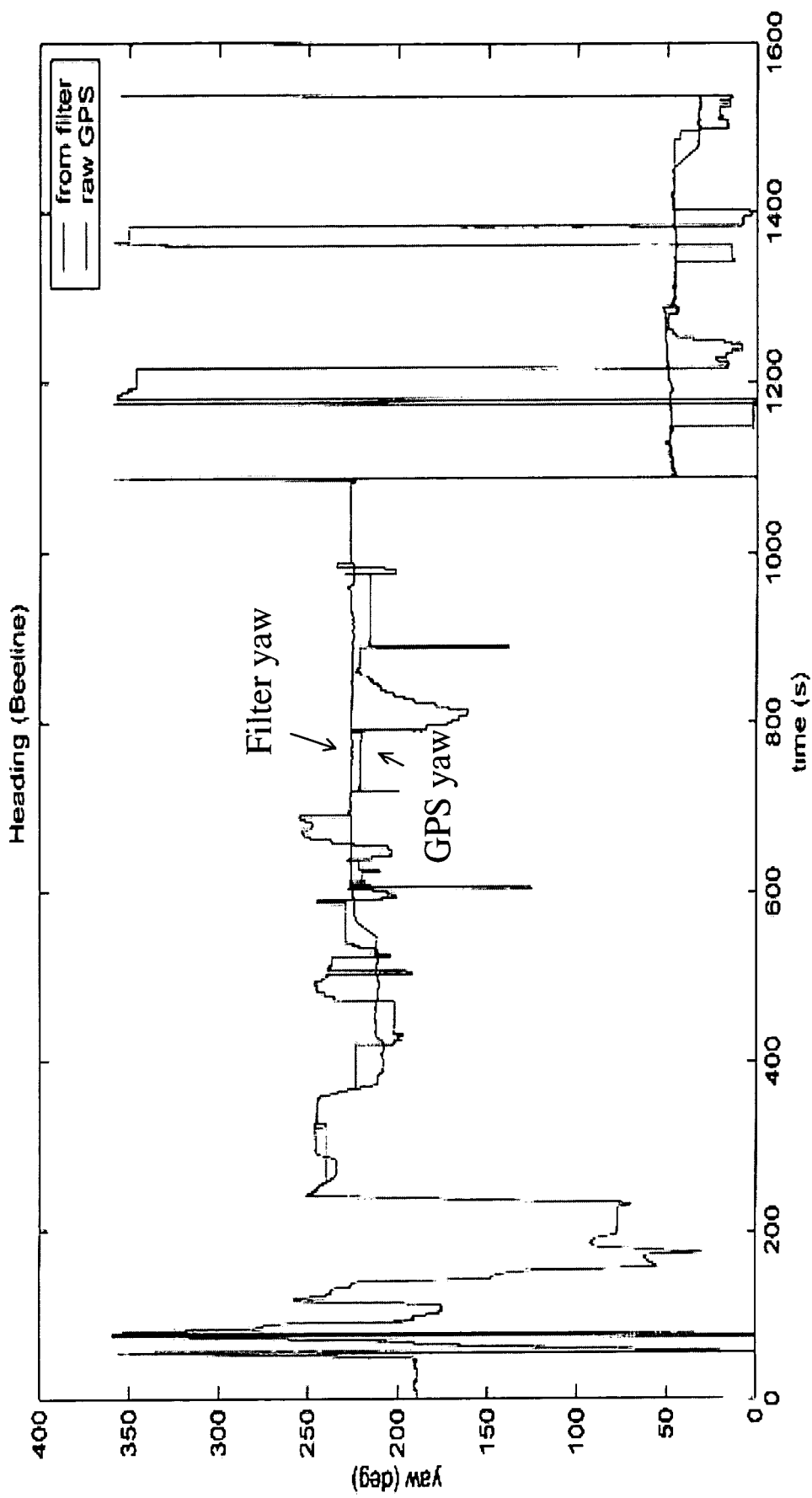
FIG. 18 shows yaw angle measurements with commercial system without robustness enhancements.

In contrast, FIG. 18 shows the yaw measurements obtained with a commercial two-antenna GPS attitude system, without an INS system. The system performs very well in an open parking lot (first 200 seconds), but loses lock when noisy conditions occur, and has difficulty reacquiring the attitude thereafter. Other road tests are performed in [7] under relatively good satellite visibility conditions, and show GPS attitude outages about 10% of the time with up to 6 satellites in view.

D. Road Test Results

The accuracy results shown thus far are for static conditions, and with a relatively open view of the sky. As may be expected, the system accuracy degrades when faced with the difficult conditions of an urban road. Although there is no "truth value" with which to compare the filter output during these tests, the error measurements from the filter $$(y_k - H\hat{x}_k(-) \text{ in Eq. 35})$$

are indicative of the shot-term GPS errors.

Figure 19:
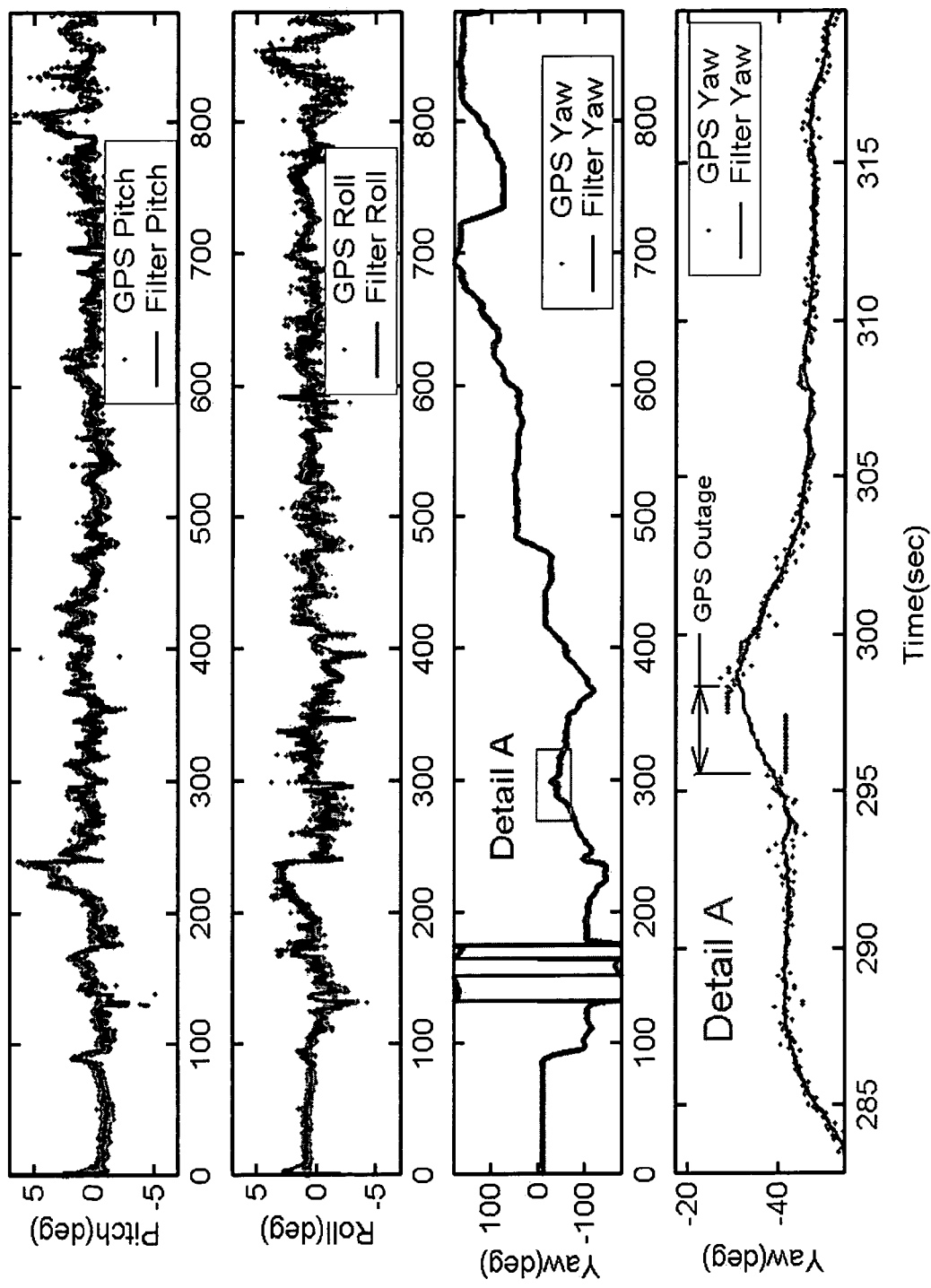
FIG. 19 shows pitch, roll, and yaw measurements from road test.

FIG. 19 shows plots of the attitude estimates during a drive test. The detail included for the yaw angle shows a short GPS outage, during which the filter output is based only on gyro-rate integration.

Figure 20:
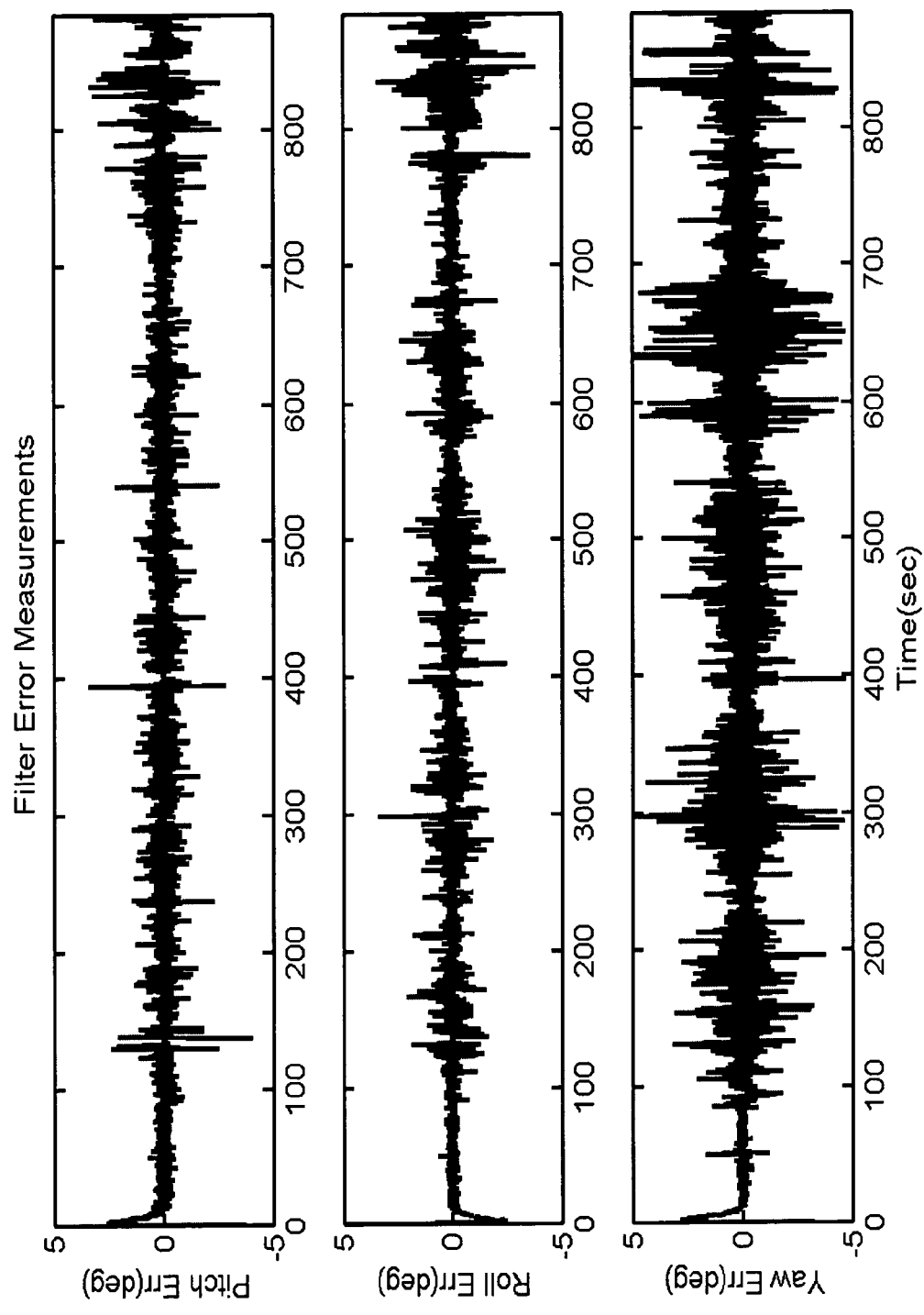
FIG. 20 shows filter error measurements ($y_k - H\hat{x}_k(-)$) from road test.

The corresponding filter-error measurements from this test are shown in FIG. 20. As shown, noisy conditions on the road can increase the noise on the GPS measurements by several degrees. Fortunately, this noise is relatively uncorrelated in time, and the filter is able to diminish most of its effect.

Figure 21:
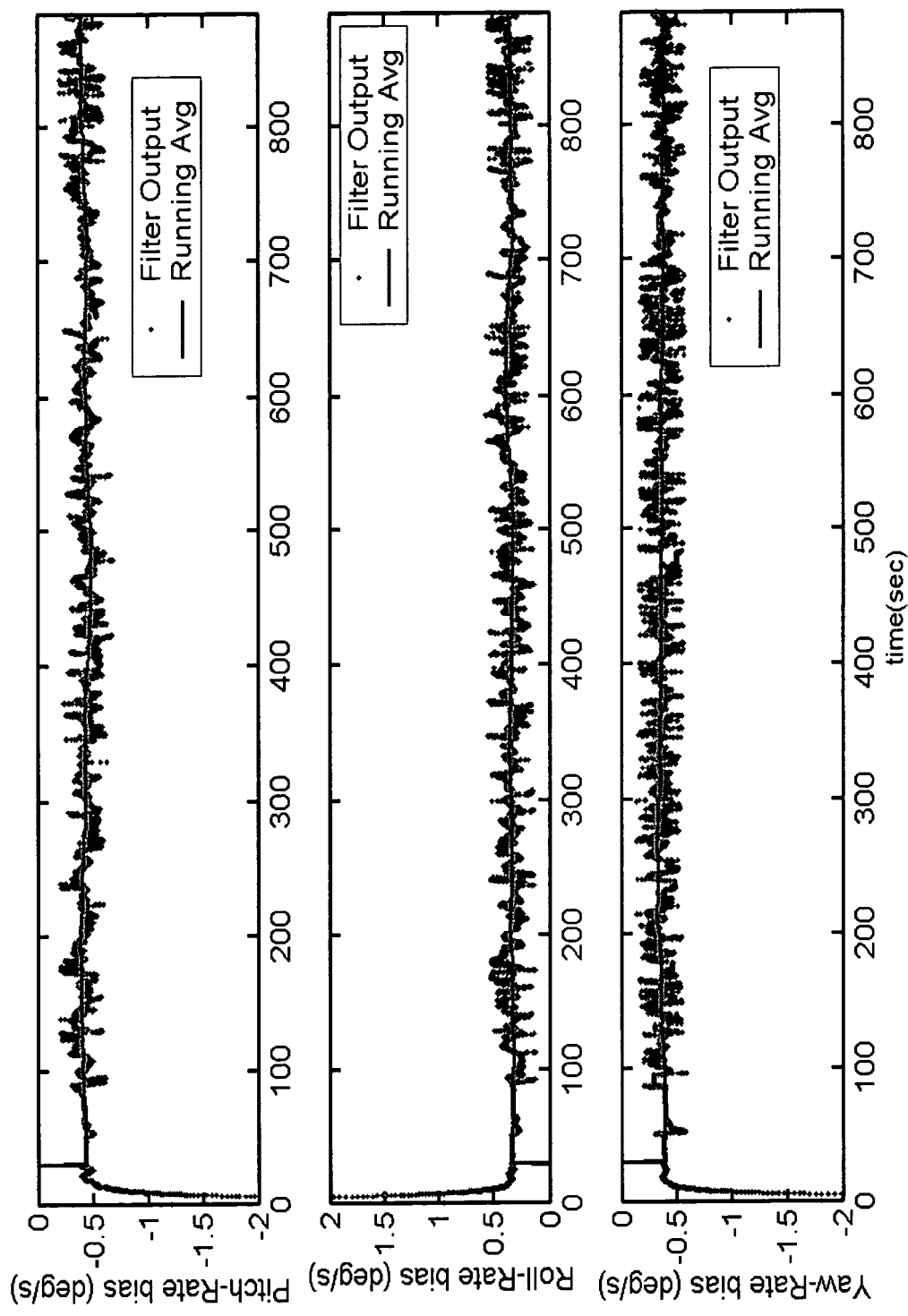
FIG. 21 shows gyro bias estimates from road test.

The increase in GPS noise also has an adverse effect on the gyro bias estimates, as shown in FIG. 21. The noisy fluctuations in the bias estimates reinforce the need to maintain an average of the bias estimates to use during GPS outages, or at least use very low gains for the bias measurement updates.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. All such variations are considered to be within the scope and spirit of the present invention as defined by the following claims and their legal equivalents.

REFERENCES

[1] Abbot, E. and Powell, J. D., "An Examination of the Relative Merits of Various Sensors for Vehicle Navigation", Proceedings of the ION GPS-95, Palm Springs, Calif., September 1995
[2] Bell, Thomas et al., "Automatic Steering of Farm Vehicles Using GPS", 3rd International Conference on Precision Agriculture, Minneapolis, Minn., June 1996
[3] Cohen, C. E., "Attitude Determination Using GPS", Ph.D. Thesis, Stanford University, 1992
[4] Dumaine, Michael, "High Precision Attitude Using Low Cost GPS Receivers", Proceedings of the ION GPS-96, Kansas City, Mo., September 1996
[5] Eissfeller, B. et.al, "An Integrated Low Cost GPS/INS Attitude Determination System and Position Location System", Proceedings of the ION GPS 96, Kansas city, Mo., September 1996. pp.975–981
[6] Euler, H. J. and Hill, C. H., "Attitude Determination: Exploring all Information for Optimal Ambiguity Resolution", Proceedings of the ION GPS-95, Palm Springs, Calif., September 1995
[7] Euler, H. J. and Hill, C. H., "An Optimal Ambiguity Resolution Technique for Attitude Determination", Proceedings of the 1996 IEEE Position Location and Navigation Symposium, PLANS, Atlanta, Ga., USA. pp 262–269
[8] Gebre-Egziabher, Demoz et al., "Inertially-Aided GPS-based Attitude Heading Reference System (AHRS) for General Aviation Aircraft", Proceedings of the ION GPS-97, Kansas City, Mo., September 1997
[9] Gebre-Egziabher, Demoz et al., "Inexpensive GPS/Inertial AHRS for General Aviation Applications", Proceedings of the 1996 IEEE Position Location and Navigation Symposium, PLANS, Palm Springs, Calif., March 98.
[10] Gebre-Egziabher, Demoz et al., "A Low-Cost GPS/Inertial Attitude Heading Reference System (AHRS) for General Aviation Aircraft", Proceedings of the IEEE Position, Location and Navigation Symposium—PLANS '98, Palm Springs, Calif., April 1998
[11] Hayward, R. C. and Powell, J. D., "Real Time Calibration of Antenna Phase Errors for Ultra-Short Baseline Attitude Systems", Proceedings of the ION GPS-98, Nashville, Tenn., September 1998.
[12] Hayward, R. C. et al., "Single Baseline GPS Based Attitude Heading Reference System (AHRS) for Aircraft Applications", Proceedings of the American Control Conference, San Diego, Calif., June 1999.
[13] Kruczynski, Loenard et al., "Results of DC-10 Tests Using GPS Attitude Determination", Proceedings of the ION GPS-95. Part 2 (of 2), Palm Springs, Calif., USA. pp. 1743–1750
[14] Robert Bosch Corporation. DRS-MM1 Yaw-Rate Sensor Specification Sheet, 1999.

What is claimed is:

1. A system to determine the attitude of a ground vehicle, comprising:
    (a) a one-satellite vehicle attitude system having only one satellite providing signals to resolve a first attitude of said ground vehicle;
    (b) a multiple-satellite vehicle attitude system having multiple satellites providing signals to resolve a second attitude of said ground vehicle;
    (c) a monitoring and decision means to determine whether to use said first attitude of said ground vehicle resolved from said one satellite or said second attitude of said ground vehicle resolved from said multiple satellites;
    (d) an inertial navigation system associated with said ground vehicle for measuring inertial components of said ground vehicle to enhance the output of said monitoring and decision means regarding said first and second attitude of said ground vehicle; and
    (e) an estimator configured to estimate a third attitude of said ground vehicle based on said output of said monitoring and decision means and said enhanced first or second attitude of said ground vehicle.

2. The system as set forth in claim 1, wherein said estimator is an attitude filter.

3. The system as set forth in claim 1, wherein said monitoring and decision means further comprises input from said estimator.

* * * * *